(12) United States Patent
Kim et al.

(10) Patent No.: US 12,656,244 B2
(45) Date of Patent: Jun. 16, 2026

(54) FLOW CELL AND CONCENTRATION MEASURING DEVICE

(71) Applicant: HOSAN TECH CO., LTD., Anseong-si (KR)

(72) Inventors: Chul Won Kim, Seoul (KR); Sung Won Jeon, Anseong-si (KR); Kyoung Ho Park, Seongnam-si (KR); Min Ki Park, Anseong-si (KR)

(73) Assignee: HOSAN TECH CO., LTD., Anseong-si (KR)

( * ) Notice: Subject to any disclaimer, the term of this patent is extended or adjusted under 35 U.S.C. 154(b) by 297 days.

(21) Appl. No.: 18/180,187

(22) Filed: Mar. 8, 2023

(65) Prior Publication Data

US 2024/0133800 A1     Apr. 25, 2024
US 2024/0230518 A9     Jul. 11, 2024

(30) Foreign Application Priority Data

Oct. 21, 2022   (KR) ........................ 10-2022-0136294
Oct. 21, 2022   (KR) ........................ 10-2022-0136313
Oct. 21, 2022   (KR) ........................ 10-2022-0136327

(51) Int. Cl.
*G01N 21/05*          (2006.01)
*G01N 21/03*          (2006.01)
(Continued)

(52) U.S. Cl.
CPC ......... *G01N 21/05* (2013.01); *G01N 21/0303* (2013.01); *G01N 21/31* (2013.01); *G01N 21/85* (2013.01); *G01N 2021/052* (2013.01)

(58) Field of Classification Search
CPC .... G01N 21/05; G01N 21/03; G01N 21/0303; G01N 21/31; G01N 21/85; G01N 21/59;
(Continued)

(56) References Cited

U.S. PATENT DOCUMENTS 4,629,903  A  *  12/1986  Giacobbe ............... B01J 8/0015
                                                      250/573
4,786,171  A  *  11/1988  LeFebre ................. G01N 21/85
                                                      356/326
(Continued)

FOREIGN PATENT DOCUMENTS

CA          2695048  A1 * 10/2010   ............. G01N 21/59
JP      H08304178  A  * 11/1996   ............. G01N 21/05
(Continued)

*Primary Examiner* — Gordon J Stock, Jr.
(74) *Attorney, Agent, or Firm* — NKL Law; Jae Youn Kim

(57) ABSTRACT

Provided is a concentration measuring device which includes: a main pipe through which a fluid whose concentration is to be measured flows; a flow cell having a fluid passage and a light passage formed to pass through the fluid passage; a spectrometer capable of measuring absorbance for each wavelength of the source light transmitted to the flow cell and the received light receiving from the flow cell; and an optical cable connecting the flow cell and the spectrometer with each other, wherein the flow cell is separated from the main pipe to be provided separately, and a fluid pipe is connected to the flow cell, so that the fluid flows from the main pipe to the flow cell through the fluid pipe using a pitot tube.

9 Claims, 26 Drawing Sheets

(51) Int. Cl.
   *G01N 21/31* (2006.01)
   *G01N 21/85* (2006.01)

(58) Field of Classification Search
   CPC ....... G01N 2021/052; G01N 2021/054; G01N
      2021/058; G01N 2021/056; G01N
      2021/0346; G01N 2021/0307; G01N
      2021/3125; G01N 2021/8557; G01N
      2201/08; G01N 2201/084
   See application file for complete search history.

(56) References Cited

U.S. PATENT DOCUMENTS

| | | | | |
|---|---|---|---|---|
| 4,872,753 A * | 10/1989 | Danigel | ................. | G01N 21/05 |
| | | | | 250/576 |
| 5,007,740 A * | 4/1991 | Jeannotte | ........... | G01N 21/8507 |
| | | | | 250/576 |
| 5,181,082 A * | 1/1993 | Jeannotte | ............... | G01N 21/83 |
| | | | | 250/576 |
| 5,268,736 A * | 12/1993 | Prather | .............. | G01N 21/0303 |
| | | | | 250/576 |
| 5,310,526 A * | 5/1994 | Yalvac | ................... | G01N 21/75 |
| | | | | 436/166 |
| 5,408,313 A * | 4/1995 | Ponstingl | ........... | G01N 21/8507 |
| | | | | 356/440 |
| 5,442,437 A * | 8/1995 | Davidson | .............. | G01N 21/05 |
| | | | | 356/246 |
| 5,452,082 A * | 9/1995 | Sanger | ................... | G01N 21/05 |
| | | | | 356/440 |
| 5,871,698 A * | 2/1999 | Laguna | ................. | G01N 21/05 |
| | | | | 422/68.1 |
| 6,289,149 B1 * | 9/2001 | Druy | ................. | G01N 21/0303 |
| | | | | 385/74 |

| | | | | |
|---|---|---|---|---|
| 6,707,555 B1 * | 3/2004 | Kusuzawa | ........... | G01N 21/474 |
| | | | | 356/440 |
| 7,307,717 B2 * | 12/2007 | Kolp | ...................... | G01N 21/05 |
| | | | | 356/70 |
| 8,564,768 B2 * | 10/2013 | Schroeder | ......... | G01N 33/2823 |
| | | | | 250/258 |
| 8,649,005 B2 * | 2/2014 | Tormod | ................. | G01N 21/05 |
| | | | | 356/246 |
| 8,699,031 B2 * | 4/2014 | Arimoto | ............... | G01N 21/03 |
| | | | | 356/440 |
| 9,267,887 B2 * | 2/2016 | Kanomata | .............. | G01N 30/74 |
| 9,404,849 B2 * | 8/2016 | Wynn | .................... | G01N 21/05 |
| 10,222,323 B2 * | 3/2019 | Deguchi | ............... | G01N 21/15 |
| 10,261,008 B2 * | 4/2019 | Svanberg | ............... | G01N 21/05 |
| 10,352,865 B1 * | 7/2019 | Yelvington | ........... | G01N 21/85 |
| 10,641,749 B2 * | 5/2020 | Harrison | ............... | G01N 21/05 |
| 11,391,668 B2 * | 7/2022 | Nagase | ................. | G01N 21/05 |
| 12,013,327 B2 * | 6/2024 | Park | ....................... | G01N 21/31 |
| 12,031,904 B2 * | 7/2024 | Anwar | .............. | G01N 21/3577 |
| 2012/0119101 A1 * | 5/2012 | Wynn | .................... | G01N 21/05 |
| | | | | 250/373 |
| 2012/0184722 A1 * | 7/2012 | Samper | ................. | G01N 30/88 |
| | | | | 534/10 |
| 2018/0156715 A1 * | 6/2018 | Francis | ................. | G01N 21/05 |
| 2018/0246031 A1 * | 8/2018 | Proskurowski | ........ | G01N 21/01 |

FOREIGN PATENT DOCUMENTS

| | | | | |
|---|---|---|---|---|
| JP | 2011257146 A | 12/2011 | | |
| JP | 2012154698 A | 8/2012 | | |
| JP | 2012237684 A | 12/2012 | | |
| KR | 10-0859744 B1 | 9/2008 | | |
| KR | 20-0444057 Y1 | 4/2009 | | |
| KR | 20140144147 A | 12/2014 | | |
| WO | WO-2022254852 A1 * | 12/2022 | ........ | G01N 21/3577 |
| WO | WO-2022259680 A1 * | 12/2022 | ........ | G01N 21/0332 |
| WO | WO-2023176091 A1 * | 9/2023 | ............ | G01N 21/05 |

* cited by examiner

FLOW CELL AND CONCENTRATION MEASURING DEVICE

CROSS REFERENCE TO RELATED APPLICATION OF THE INVENTION

The present application claims the benefit of Korean Patent Application No. 10-2022-0136294, filed in the Korean Intellectual Property Office on Oct. 21, 2022, Korean Patent Application No. 10-2022-0136313, filed in the Korean Intellectual Property Office on Oct. 21, 2022, and Korean Patent Application No. 10-2022-0136327, filed in the Korean Intellectual Property Office on Oct. 21, 2022, the entire contents of which are incorporated herein by reference.

BACKGROUND OF THE INVENTION

Field of the Invention

The present invention relates to a flow cell and a concentration measuring device, and more particularly, to a concentration measuring device equipped with a flow cell for measuring the concentration of a specific chemical component in a liquid through a spectroscopic concentration measurement method using a spectrometer.

Background Art

In general, a flow cell is an optical cell used in photometers and cell counters, and samples and all standard materials are measured or counted by electrical measurement or optical means after passing through a detection process through the flow cell.

When near-infrared light (NIR) passes through a liquid in which chemical is dissolved, the absorbance of light of a specific wavelength changes with respect to a concentration of a specific chemical. That is, the absorbance increases as the concentration of the chemical increases.

Using this phenomenon, it is possible to measure the concentration of a specific chemical component in a liquid, and this concentration measurement method is called a spectroscopic concentration measurement method.

A conventional concentration measuring device includes a spectrometer, an optical cable, a flow cell, and a control and computing device for processing light absorption result data. Korean Patent No. 10-0859744 and Korean Utility Model Registration No. 20-0444057 previously filed by the present applicant disclose apparatuses for measuring the concentration of a composition in a liquid using a spectrometer.

The conventional concentration measuring apparatuses have problems in that the coupling structure between the components is complicated, it is difficult to fix a lens, and the sealing structure of the fluid is weak. On the other hand, in a case in which a passage width through which light is transmitted satisfies a predetermined width, the measurement result is most desirable, and this width may be narrowed or increased depending on objects to be measured. In the conventional concentration measuring apparatuses, it is difficult to form such a passage width relatively narrow (approximately 10 mm), and in this case, in a case in which a fluid sealing structure is added, it is impossible to secure the passage width or it is difficult to design.

In addition, since the conventional concentration measuring apparatuses have a structure in which the flow cell is directly connected to a main pipe through which the fluid flows, it is difficult to install it in a main fluid pipe having a relatively large diameter, and it is complicated to make it to satisfy a predetermined width (approximately 10 mm) of the aforementioned passage. In addition, the conventional concentration measuring apparatuses also have a problem in that compatibility is deteriorated since flow cells of different specifications must be used according to main fluid pipes of various sizes.

PATENT LITERATURE

Patent Documents

Patent Document 1: Korean Patent No. 10-0859744 (Sep. 17, 2008)

Patent Document 2: Korean Utility Model Registration No. 20-0444057 (Mar. 31, 2009)

SUMMARY OF THE INVENTION

Accordingly, the present invention has been made to solve the above-mentioned problems occurring in the prior arts, and it is an object of the present invention to provide a flow cell, which has a simple structure between components, is easy to fix a lens, improves a sealing structure of a fluid, and secures a predetermined passage width, thereby improving concentration measurement performance.

It is another object of the present invention to provide a concentration measuring device equipped with a spectrometer and a flow cell, which has an improved compatibility since being applicable to various sizes as well as a main fluid pipe having a relatively large diameter, and can measure a fluid even in a stationary state to increase the precision.

To accomplish the above object, according to the present invention, there is provided a flow cell including: a body having a fluid passage and a light passage formed to pass through the fluid passage; an optical cable connected to the body to transmit source light from a spectrometer to the body and to transmit receiving light from the body to the spectrometer; lens bodies provided on both sides of the fluid passage to diffuse and condense light; windows provided on both sides of the fluid passage and inserted into the light passage to transmit light; and a connector fixing the windows to the body and connecting the lens bodies, wherein a source light cable and a light receiving cable are arranged to face each other with respect to the body, and wherein an O-ring is provided to seal between the fluid passage and the light passage.

In another aspect of the present invention, provided is a flow cell including: a body having a fluid passage and a light passage formed to pass through the fluid passage; an optical cable connected to the body to transmit source light from a spectrometer to the body and to transmit receiving light from the body to the spectrometer; mirror lens bodies provided on both sides of the fluid passage to diffuse and condense light; windows provided on both sides of the fluid passage and inserted into the light passage to transmit light; and a lens bushing fixing the windows to the body and connected to the mirror lens bodies, wherein a source light cable and a light receiving cable are arranged to be side by side with each other by being connected in the same direction with respect to the body, and an O-ring is provided to seal between the fluid passage and the light passage.

In a further aspect of the present invention, provided is a concentration measuring device including: a main pipe through which a fluid whose concentration is to be measured flows; a flow cell having a fluid passage and a light passage formed to pass through the fluid passage; a spectrometer capable of measuring absorbance for each wavelength of the source light transmitted to the flow cell and the received light receiving from the flow cell; and an optical cable connecting the flow cell and the spectrometer with each other, wherein the flow cell is separated from the main pipe to be provided separately, and a fluid pipe is connected to the flow cell, so that the fluid flows from the main pipe to the flow cell through the fluid pipe using a pitot tube.

The concentration measuring device equipped with a spectrometer and a flow cell according to the present invention has a simple coupling structure between components, is easy to fix a lens, improves a sealing structure of a fluid, and secures a predetermined passage width, thereby improving concentration measurement performance.

In addition, the concentration measuring device equipped with a spectrometer and a flow cell according to the present invention has an improved compatibility since being applicable to various sizes as well as a main fluid pipe having a relatively large diameter, and can measure a fluid even in a stationary state to increase the precision.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
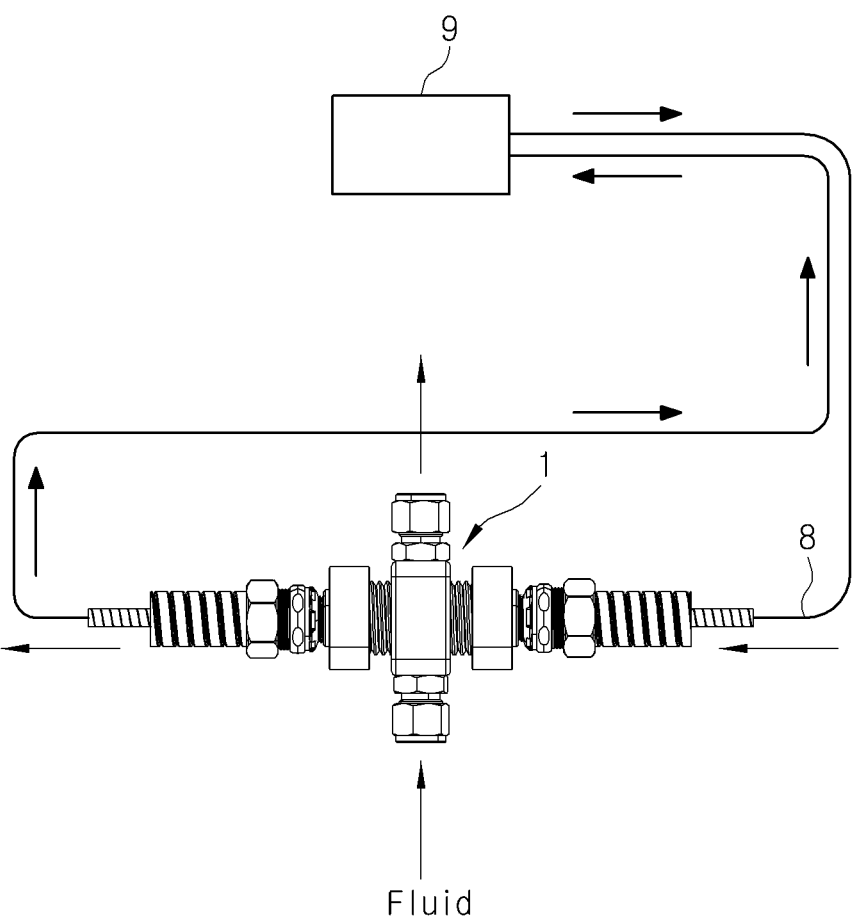
FIG. 1 schematically shows a configuration of a concentration measuring device according to a first embodiment of the present invention.
Figure 2:
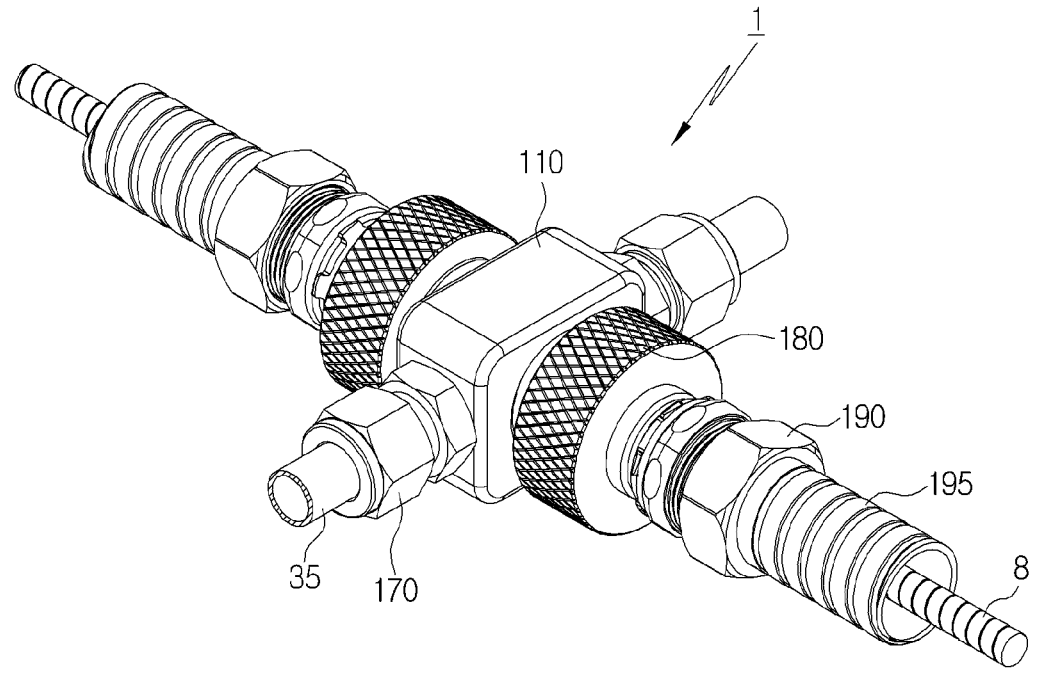
FIG. 2 is a perspective view illustrating a flow cell according to the first embodiment of the present invention.
Figure 3:
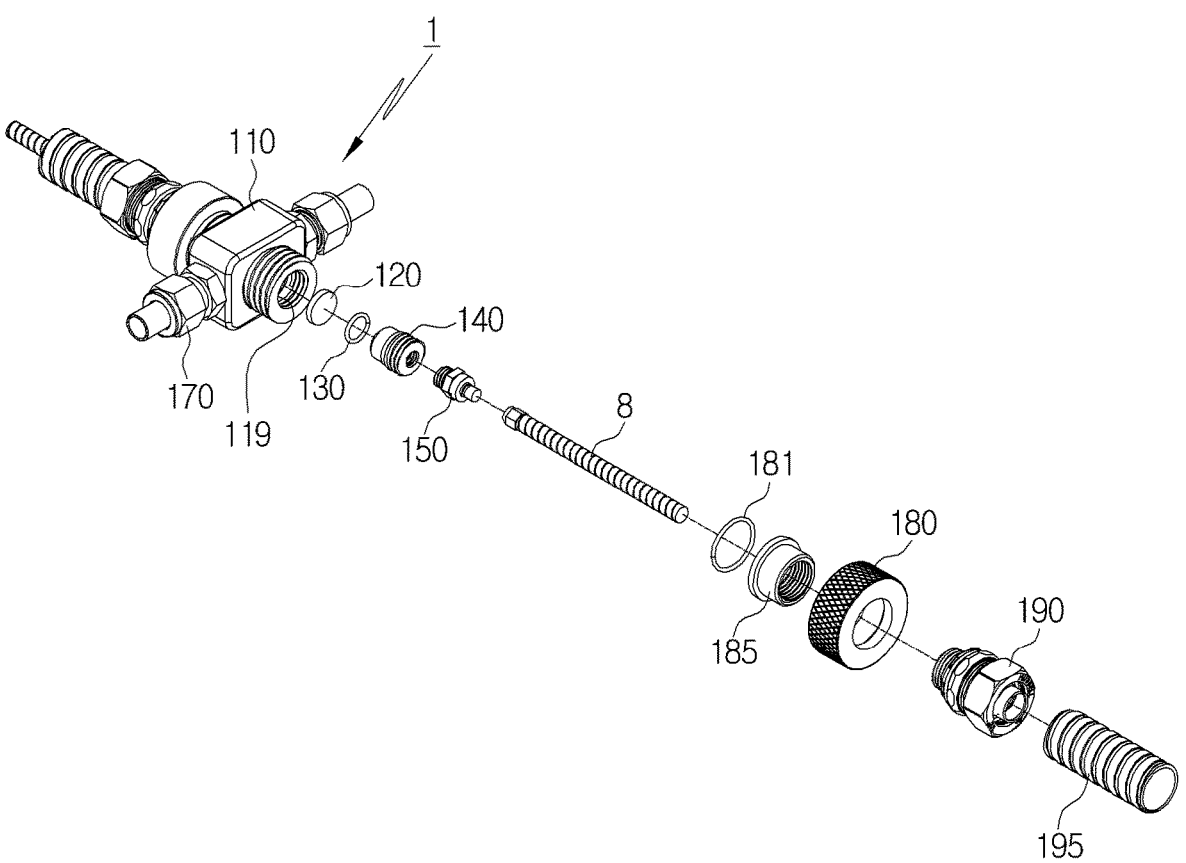
FIG. 3 is a partially exploded perspective view illustrating the flow cell according to the first embodiment of the present invention.
Figure 4:
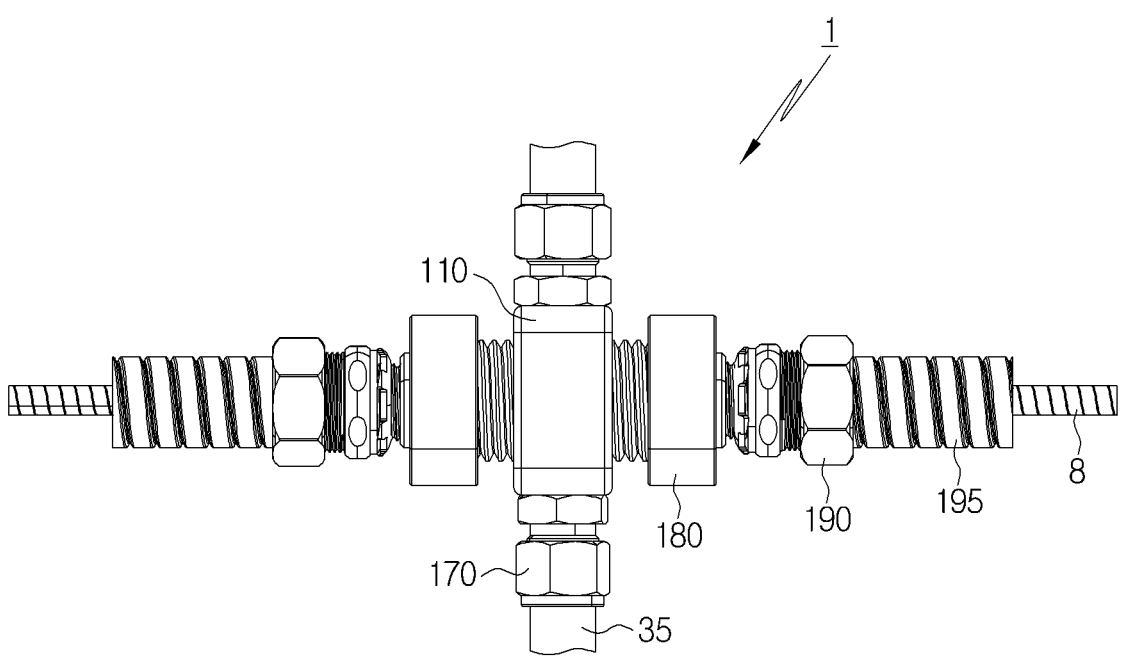
FIG. 4 is a plan view illustrating the flow cell according to the first embodiment of the present invention.
Figure 5:
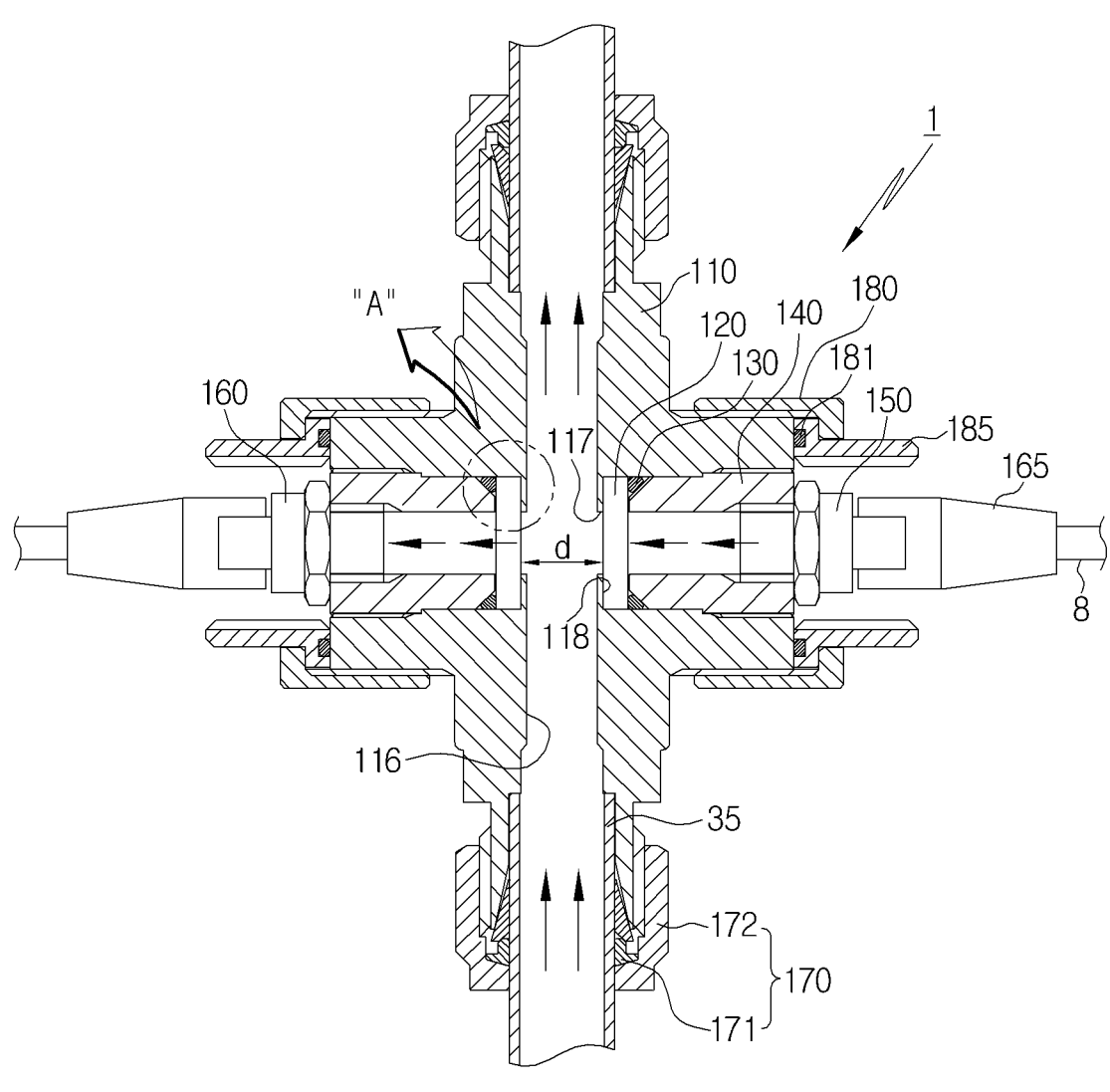
FIG. 5 is a cross-sectional view illustrating the inside of the flow cell according to the first embodiment of the present invention.

Hereinafter, technical configurations of a flow cell and a concentration measuring device will be described in detail according to the accompanying drawings.

Referring to FIGS. 1 to 9, a concentration measuring device according to a first embodiment of the present invention includes a main tube, a flow cell 1, a spectrometer 9, an optical cable 8, and a control and computing device.

The main pipe is a passage through which a fluid to be measured in concentration flows, and includes an insert block 3, a pipe part 4, and a fastening part. The insert block 3 has a fluid passage 32 formed in the center. The fluid passage 32 is formed to pass through both sides of the insert block 3 in a longitudinal direction of the tube. In addition, a plurality of fastening holes 31 are formed in the insert block 3. The fastening hole 31 is formed to pass through both sides of the insert block 3 in the longitudinal direction of the tube, and is formed along the circumference of the insert block 3 based on the fluid passage 32.

A pitot pipe inlet 33 and a pitot pipe outlet 34 are formed on the inner circumferential surface of the fluid passage 32. The pitot pipe inlet 33 is formed on one side of the inner circumferential surface of the main pipe to send a fluid to the flow cell 1. The pitot pipe outlet 34 is formed on the other side of the inner circumferential surface of the main pipe to send the fluid from the flow cell 1 to the main tube. That is, the pitot pipe inlet 33 is formed to open toward the upstream side in a flow direction of the fluid, so that the fluid flows from the fluid passage 32 to the flow cell 1. In addition, the pitot pipe outlet 34 is formed to open toward the fluid passage 32 so that the fluid returns from the flow cell 1 to the fluid passage 32.

The pipe part 4 is coupled to both sides of the insert block 3 in the longitudinal direction of the pipe. That is, one pipe part 4 is coupled to one side of the insert block 3, and the other pipe part 4 is coupled to the other side of the insert block 3, so that the pipe part 4 and the insert block 3 become a passage for the fluid. A flange part 45 is formed on the outer circumferential surface of the pipe part 4, and a hole corresponding to the fastening hole 31 of the insert block 3 is formed in the flange part 45.

The fastening part is inserted into the fastening hole 31 of the insert block 3 to couple the insert block 3 and the pipe part 4 with each other. The fastening part may include a bolt 46 and a nut 47 which are fastened through the hole of the pipe part 4 and the fastening hole 31 of the insert block 3. It is preferable that a gasket 49 is configured between the pipe part 4 and the insert block 3 to maintain airtightness of the fluid. The insert block 3 and the pipe part 4 can be combined with and separated from each other through the fastening part.

The flow cell 1 has a fluid passage formed therein and a light passage so as to pass through the fluid passage. In addition, fluid tubes 35 are detachably connected to both sides of the fluid passage of the flow cell 1. The fluid pipe 35 is connected to the main pipe through the pitot pipe inlet 33 and the pitot pipe outlet 34. The pitot pipe inlet 33 generates a fluid flow to the flow cell 1 through a front hole of the fluid flow path. The pressure of the pitot pipe inlet 33 to which dynamic pressure is applied is greater than the pressure of the pitot pipe outlet 34 to be as large as the kinetic energy head, so that a flow of the fluid is generated from the pitot pipe inlet 33 to the pitot pipe outlet 34 through the flow cell 1.

The spectrometer 9 sends source light to the flow cell 1 through the optical cable 8 and receives the light that passed through the flow cell 1 through the optical cable 8, so an amount of light absorbed generated while the source light passes through the flow cell 1 is measured by each wavelength of light so as to measure a light absorption amount. The optical cable 8 connects the spectrometer 9 with the flow cell 1. The optical cable 8 is connected to the flow cell 1 and serves as a passage for sending the source light from the spectrometer 9 to the body and the received light from the flow cell 1 to the spectrometer 9.

The control and computing device measures a difference between the source light and the received light, which have a specific wavelength changed while passing through the fluid in the flow cell 1, in the spectrometer 9, and then, absorption data is compared with standard data to analyze them, so all components of chemicals mixed in the fluid can be identified. The control and computing device may be configured to externally display information on the measured concentration.

In particular, the flow cell 1 is provided separately from the main pipe, and the fluid pipe 35 is connected to the flow cell 1. The concentration measuring device moves the fluid from the main pipe to the flow cell 1 through the fluid pipe 35 according to the flow rate (pressure) using a pitot pipe to which Bernoulli's principle is applied. When the fluid flowing in a wide area meets the pitot tube, the pressure of the pitot pipe increases, and a pressure difference between the inside and outside of the pitot pipe is generated, and this pressure difference is proportional to the square of the fluid velocity.

Figure 10:
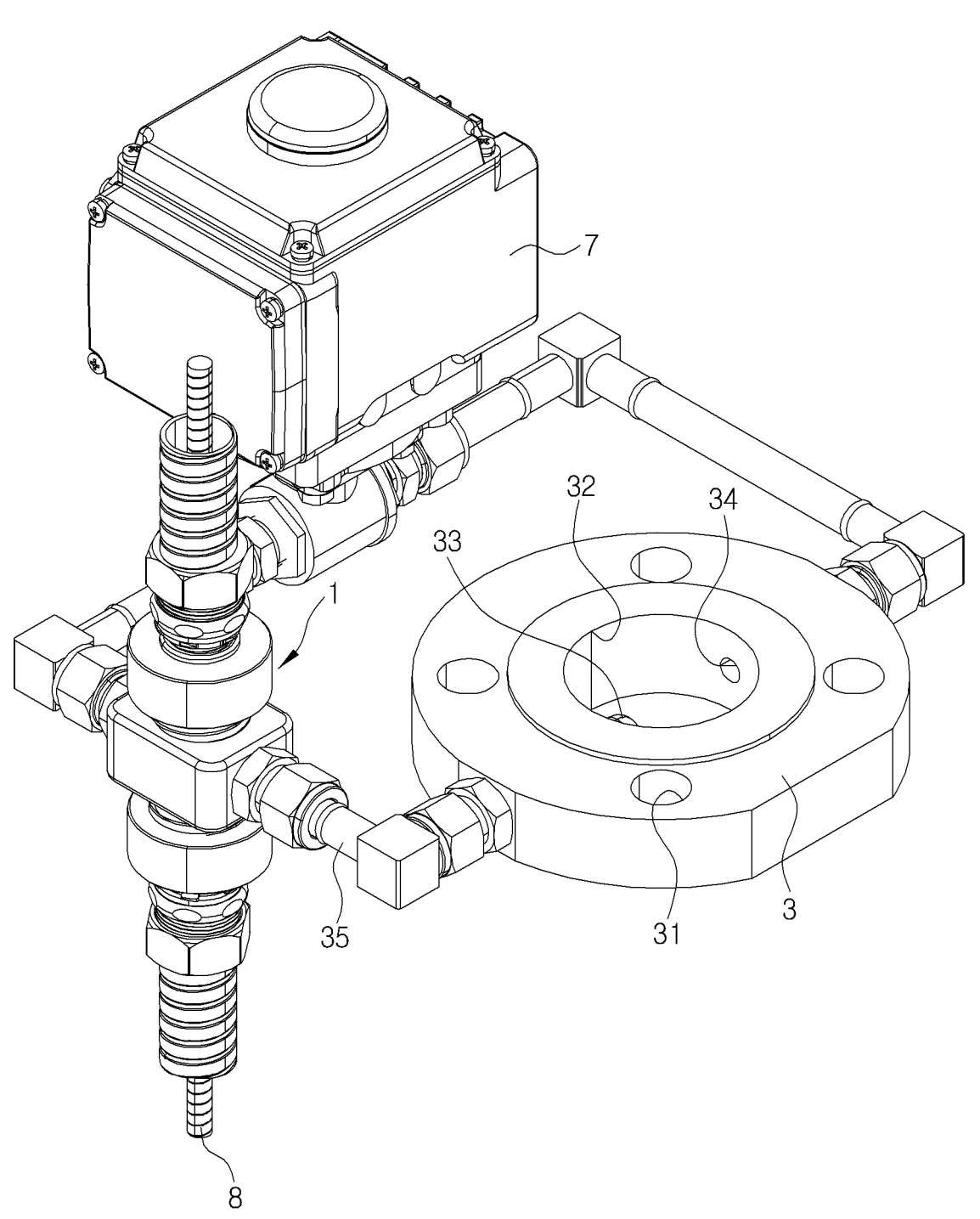
FIG. 10 shows that a valve unit is added to the concentration measuring device according to the first embodiment of the present invention.
Figure 11:
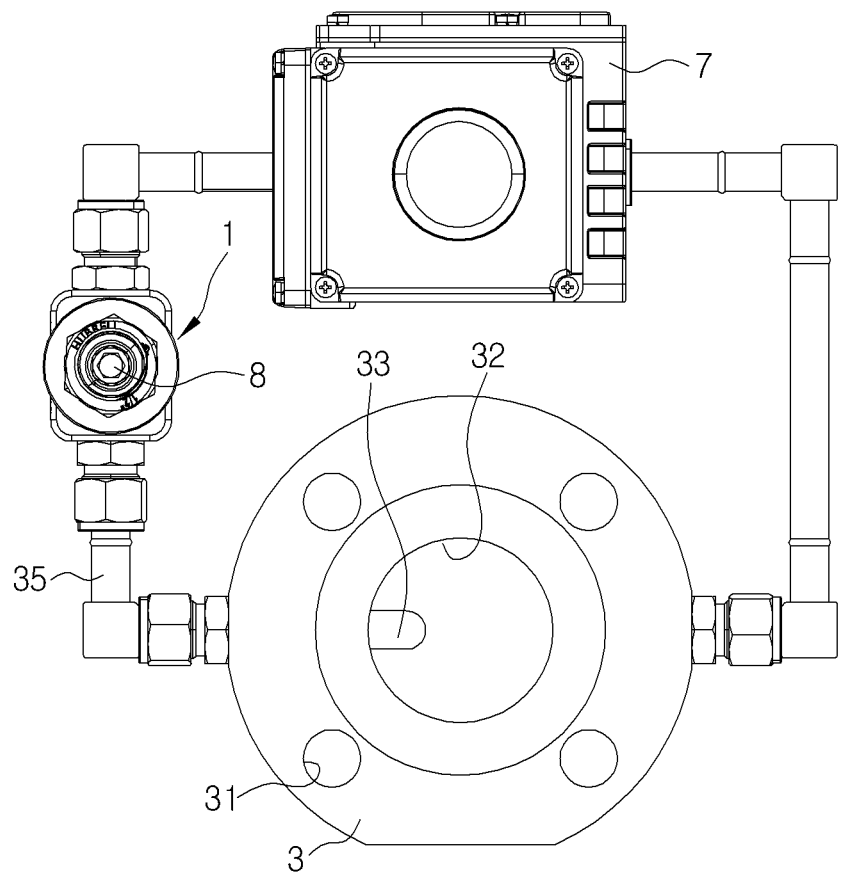
FIG. 11 is a plan view of FIG. 10.

Meanwhile, further referring to FIGS. 10 and 11, the concentration measuring device may further include a valve unit 7. The valve unit 7 may be a motorized valve or a pneumatic valve, and serves to stop the flow of fluid flowing through the fluid passage of the flow cell 1. The valve unit 7 is preferably disposed in the fluid pipe 35 downstream of the flow cell 1 in the fluid flow direction. The measurement accuracy can be improved if the absorbance is measured while the flow of the fluid is stopped. The valve unit 7 is controlled to be closed only when the concentration of the fluid is measured but is opened normally. Therefore, it is possible to improve the measurement accuracy without affecting the fluid flow in the main pipe.

Figure 12:
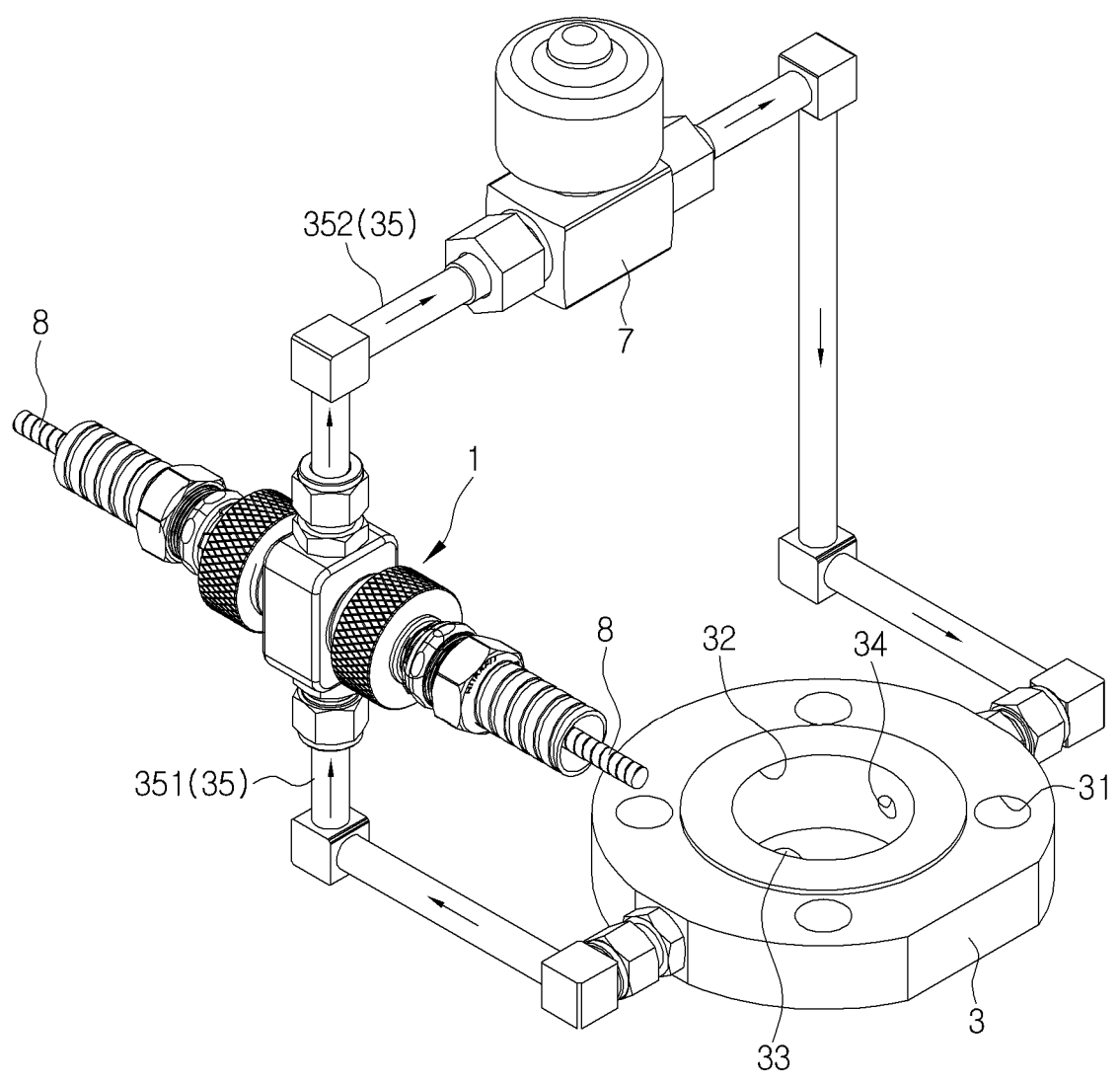
FIG. 12 is a perspective view illustrating a state in which the flow cell according to the first embodiment of the present invention is installed in a vertical tube.
Figure 13:
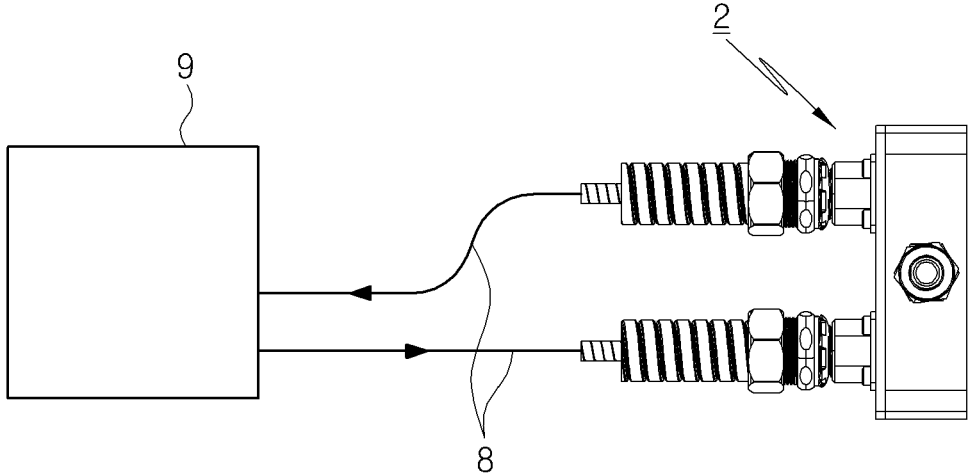
FIG. 13 schematically illustrates the configuration of a concentration measuring device according to a second embodiment of the present invention.
Figure 14:
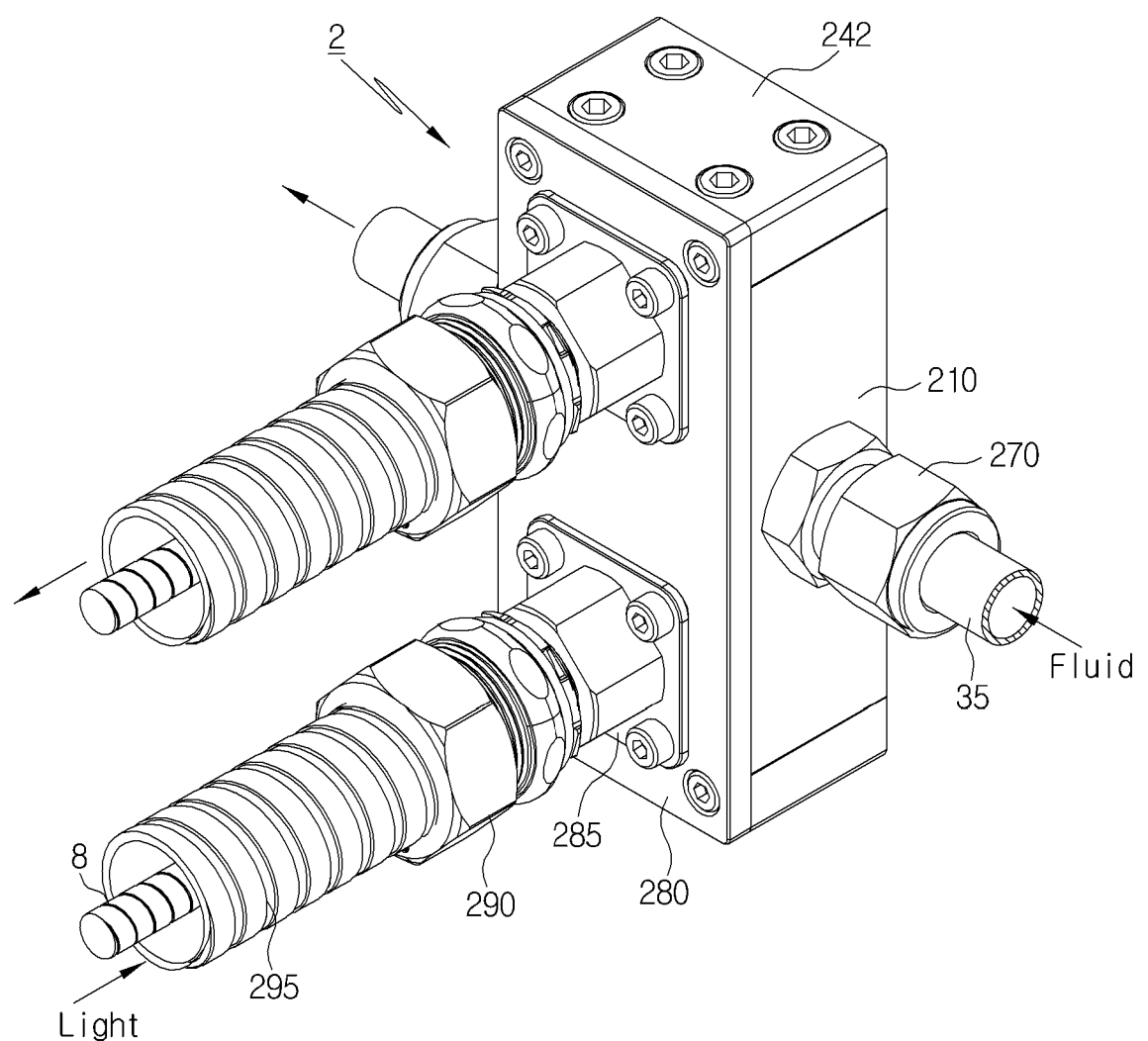
FIG. 14 is a perspective view illustrating a flow cell according to the second embodiment of the present invention.
Figure 15:
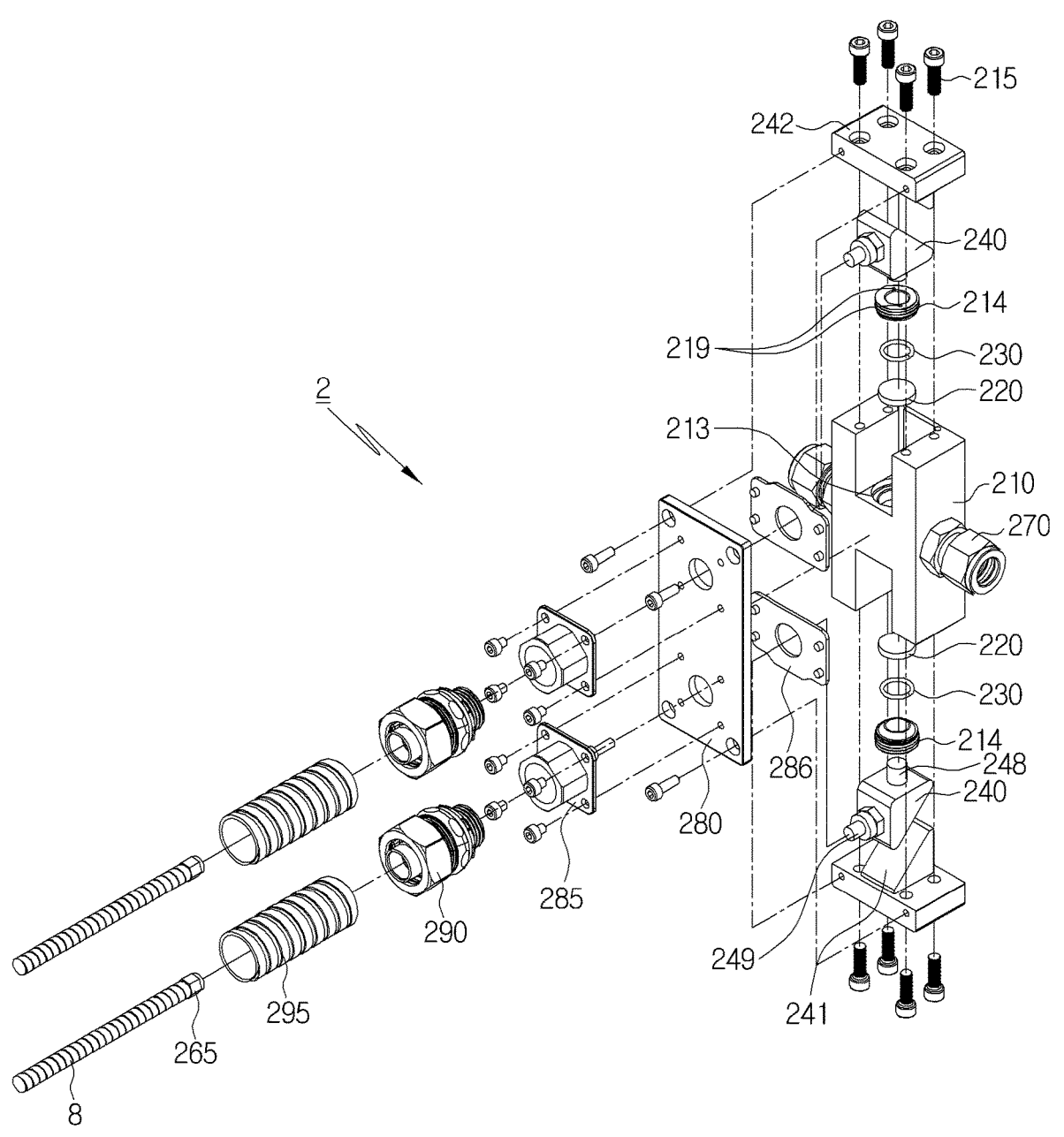
FIG. 15 is a partially exploded perspective view illustrating the flow cell according to the second embodiment of the present invention.
Figure 16:
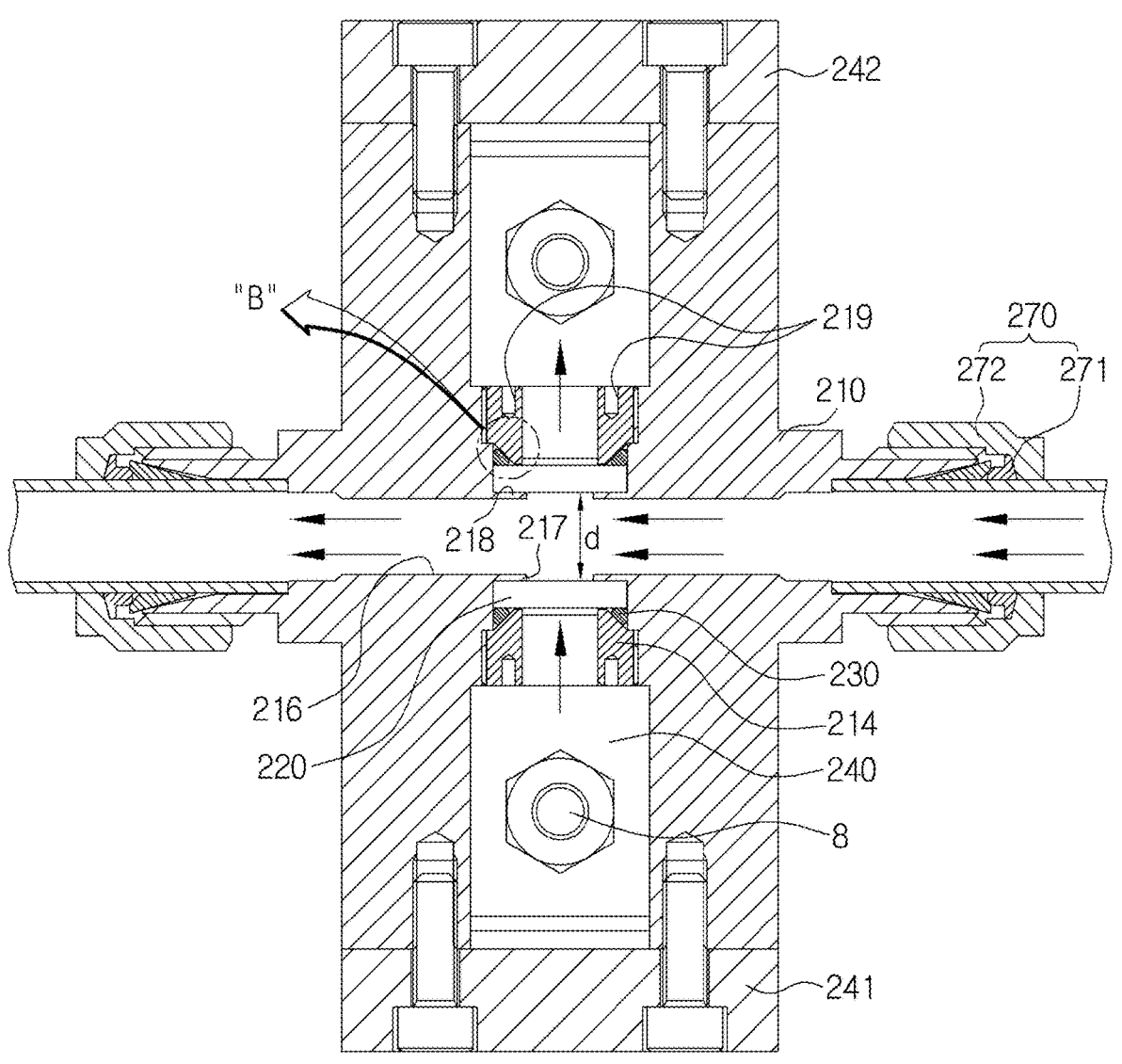
FIGS. 16 and 17 are cross-sectional views illustrating the inside of the flow cell according to the second embodiment of the present invention.
Figure 17:
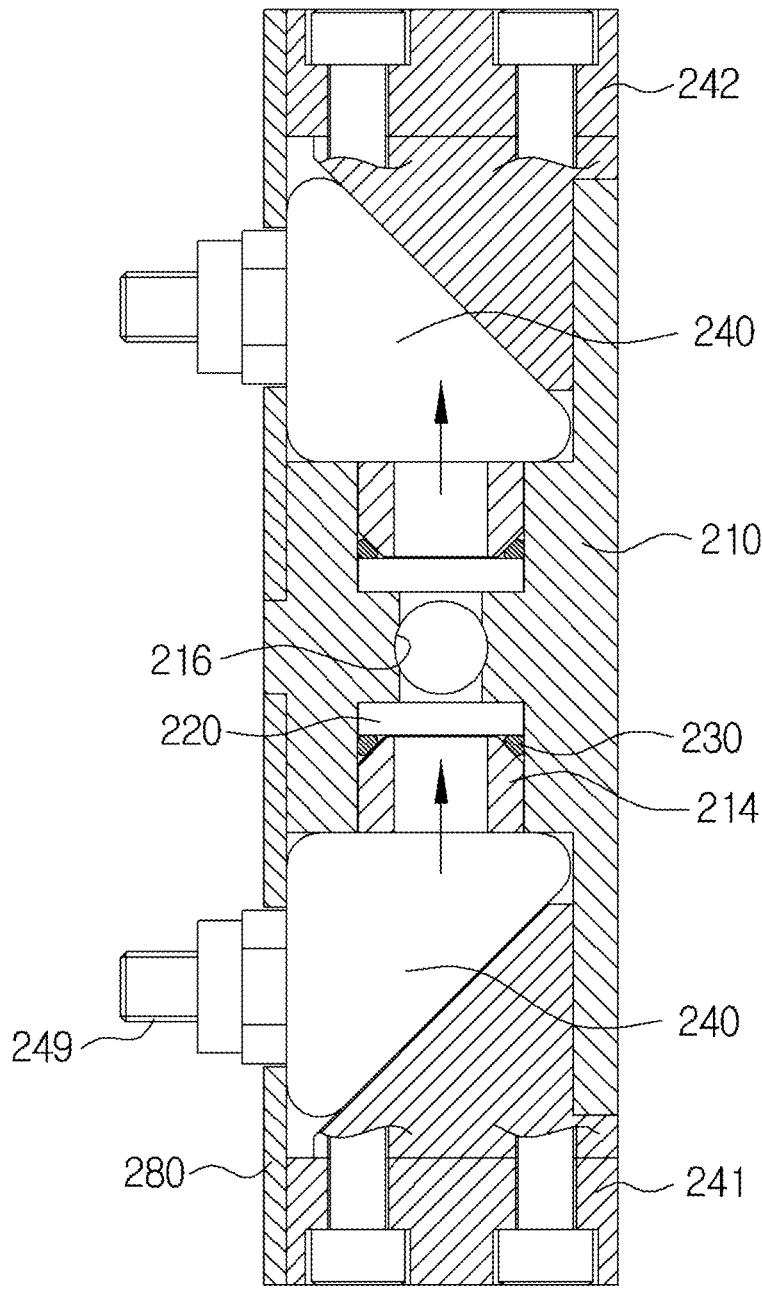

Further referring to FIG. 12, the flow cell 1 is disposed on a vertical portion 351 of the fluid pipe 35. The fluid pipe 35 is connected to the outside from the main tube, and has the vertical portion 351 and a horizontal portion 352. In a case in which the insert block 3 is installed in the main pipe of the vertical pipe structure, the insert block 3 is inevitably horizontal. If there are bubbles in the fluid to be measured, the measurement accuracy is reduced. Therefore, in order to raise the bubbles in the fluid pipe 35 from the flow cell 1, which is the measurement point, by buoyancy in a state in which the fluid is stopped by closing the valve unit 7, the flow cell 1 is preferably mounted on the vertical portion 351. The valve unit 7 may be installed on the horizontal portion 352 of the fluid pipe 35 or installed on the vertical portion 351, and is preferably installed more downstream than the flow cell 1 in the fluid flow direction.

The flow cell 1 according to the first embodiment includes a body 110, lens bodies 150 and 160, a window 120, a connector 140, and an O-ring 130. The optical cable 8 is connected to the body 110 through a cable coupler 165, and transmits source light from the spectrometer 9 to the body 110 and receives light from the body 110 to the spectrometer 9. That is, a source light cable is connected to one side of the body 110 and a light receiving cable is connected to the other side. In this case, the source light cable and the light receiving cable are configured as a straight type in which they are opposed to each other with respect to the body 110.

The body 110 has a fluid passage formed therein and a light passage so as to pass through the fluid passage. The body 110 also has a fluid hole 116 and an optical hole 117. The fluid hole 116 is formed to pass through the body 110 as a passage of fluid. The optical hole 117 is formed to pass through in an orthogonal direction to the fluid hole 116. The fluid hole 116 and the optical hole 117 directly communicate with each other while crossing each other inside the body 110. That is, the fluid hole 116 and the optical hole 117 in the body 110 communicate with each other, and when a fluid is injected through the fluid hole 116, the optical hole 117 is also filled with the fluid.

The lens bodies 150 and 160 are provided on both sides of the fluid passage of the body 110 to diffuse and condense light. That is, the lens bodies 150 and 160 are composed of a source light lens body 150 to diffuse light and a light receiving lens body 160 to focus light. The source light lens body 150 is coupled to one side based on the fluid hole 116 of the body 110, and the light receiving lens body 160 is coupled to the other side based on the fluid hole 116 of the body 110. The lens bodies 150 and 160 are screwed to an end of the connector 140.

The window 120 is provided on both sides of the fluid passage of the body 110 and is inserted into the light passage to allow light to pass therethrough. The window 120 has a circular plate shape which is relatively thin, and includes a transparent transmission plate made of sapphire or fluorinated ethylene propylene (FEP), and allows light to pass through while preventing fluid from passing therethrough. A stepped portion 118 is formed on the inner circumferential surface of the optical hole 117 of the body 110. The window 120 is inserted into the optical hole 117 of the body 110, and supported by the stepped portion 118 of the body 110. The connector 140 is fastened to an end of the window 120 opposite to the stepped portion 118. A pair of windows 120 directly face the fluid hole 116 while facing each other.

The connector 140 fixes the window 120 to the body 110 and serves to connect the lens bodies 150 and 160. Both sides of the connector 140 are formed to penetrate through the central portion in the longitudinal direction, and light passes through a penetrated portion. The connector 140 is screw-coupled into the opening 119 communicating with the optical hole 117 of the body 110, and one end of the connector 140 in the longitudinal direction fixes the window 120 while bringing the window 120 closer to the stepped portion 118 of the body 110. Furthermore, the lens bodies 150 and 160 are coupled to the other end portion of the connector 140 in the longitudinal direction. The connector 140 may have a tool hole formed at an end facing the lens bodies 150 and 160. In this instance, a plurality of the tool holes may be formed to insert tools for fastening the connector 140 to the body 110.

The O-ring 130 seals between the fluid passage and the light passage of the body 110. The O-ring 130 is disposed outside the window 120 based on the fluid passage of the body 110. That is, the O-ring 130 is formed between the window 120 and the connector 140. An inclined taper 145 is formed at an end of the connector 140 facing the window 120. When the connector 140 is fastened to the optical hole 117 of the body 110 and the window 120 is fixed to the body 110, the taper 145 makes the O-ring 130 come into contact with the stepped portion 118 of the body 110.

Figure 6:
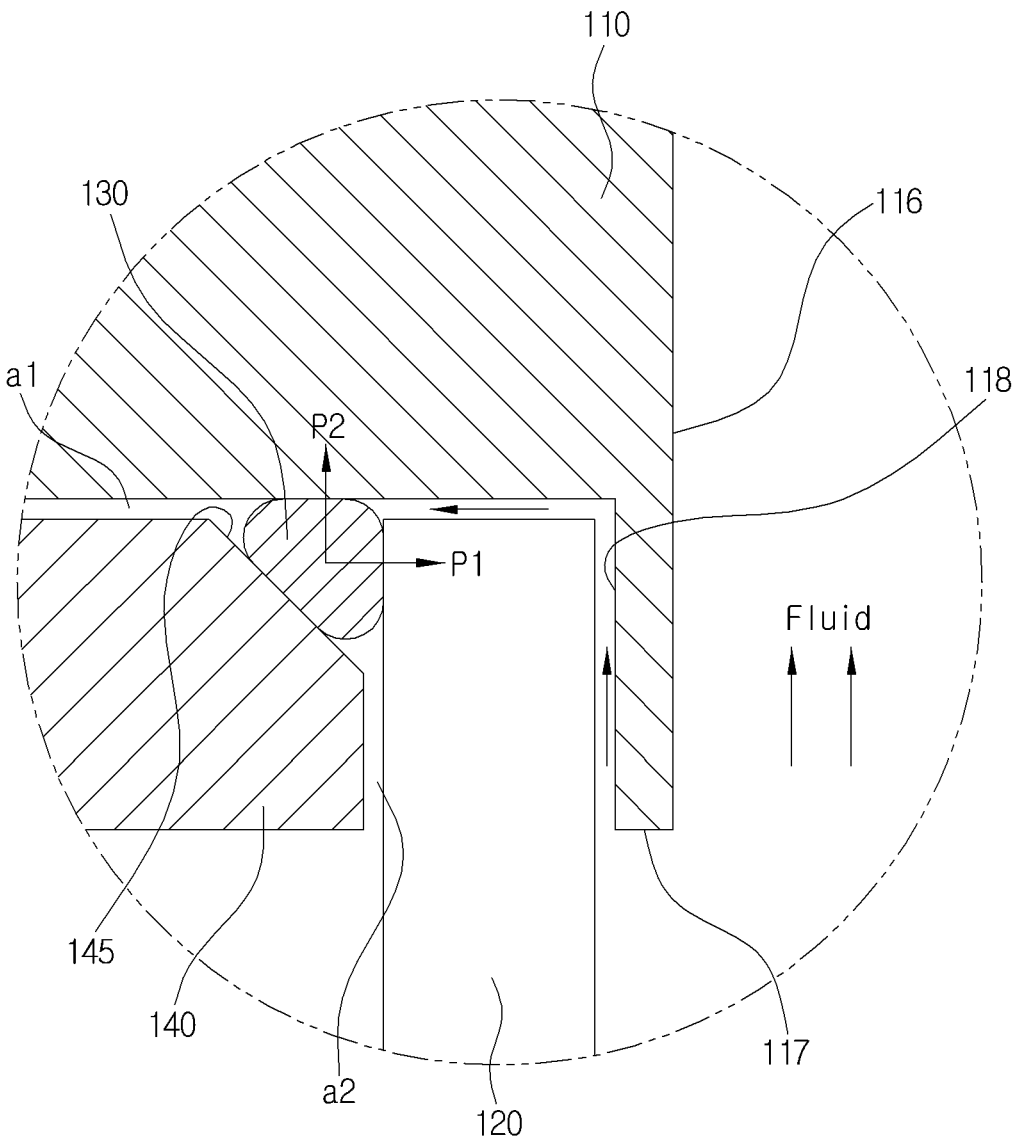
FIG. 6 is an enlarged cross-sectional view of "A" in FIG. 5.
Figure 7:
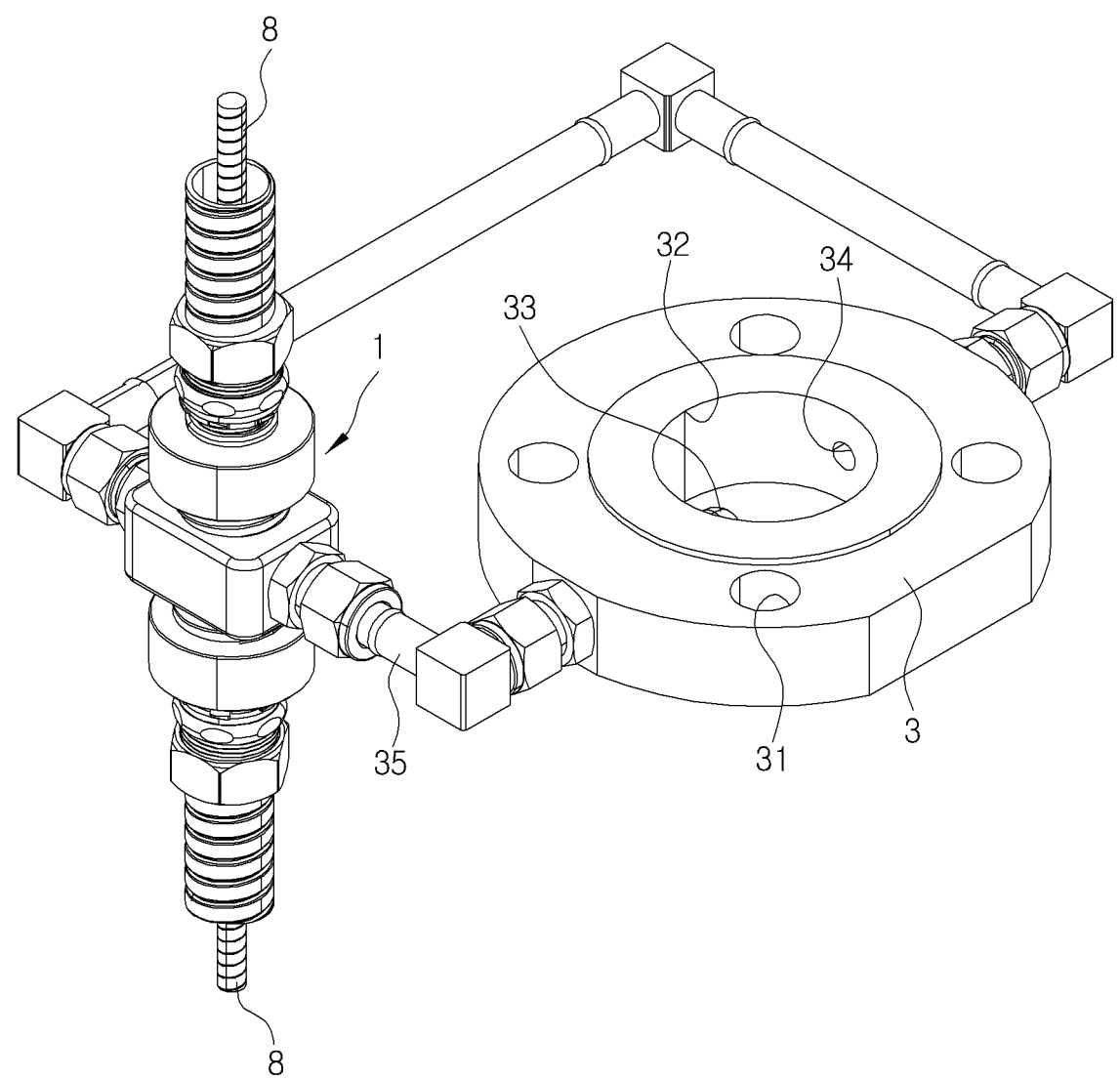
FIG. 7 is a perspective view illustrating the concentration measuring device according to the first embodiment of the present invention.
Figure 8:
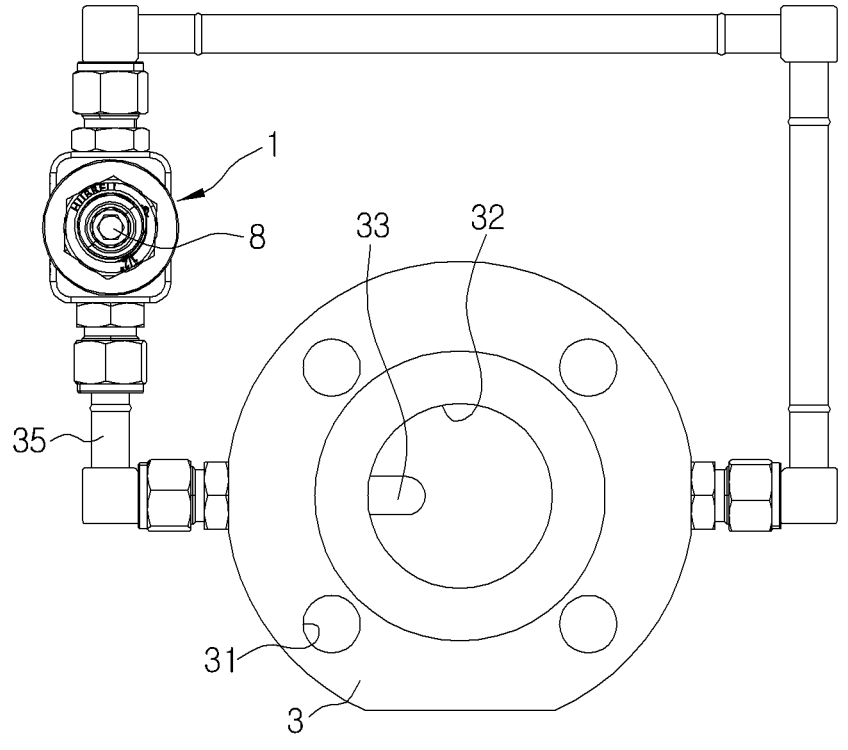
FIG. 8 is a front view illustrating the concentration measuring device according to the first embodiment of the present invention.
Figure 9:
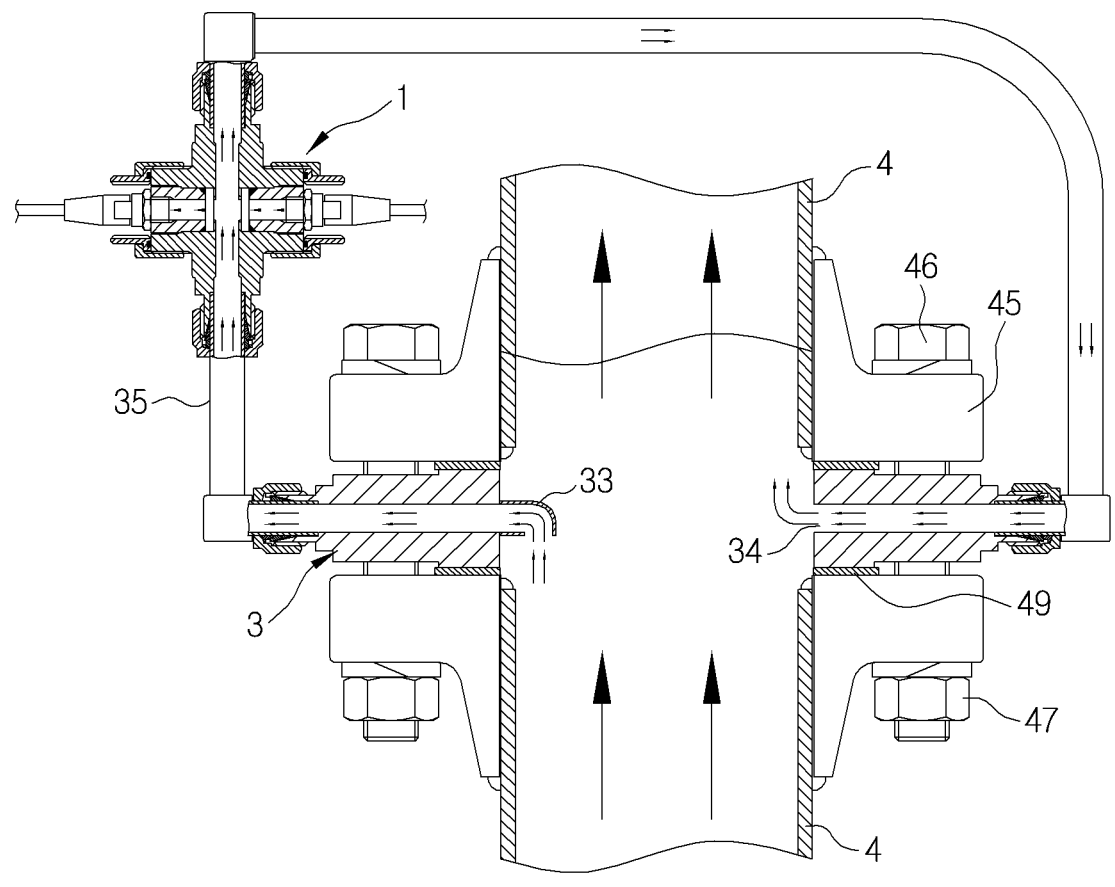
FIG. 9 is a cross-sectional view illustrating the inside of the concentration measuring device according to the first embodiment of the present invention.

As illustrated in FIG. 6, when the connector 140 is fastened to the body 110, the window 120 is fixed between the stepped portion 118 of the body 110 and the connector 140. In this case, a fine gap is formed between the end of the window 120 and the stepped portion 118 in the longitudinal direction of the optical hole 117, and another fine gap is formed between the end of the window 120 and the inner circumferential surface of the optical hole 117 in a radial direction. The fluid flowing through the fluid hole 116 passes through the stepped portion 118 and flows toward the O-ring 130 through the fine gap as indicated by an arrow.

In this case, the taper 145 formed on the inclined surface of the connector 140 presses the O-ring 130 in a direction P1 and a direction P2. Accordingly, it is possible to prevent fluid from leaking through a gap a2 between the connector 140 and the window 120 and a gap a1 between the connector 140 and the optical hole 117.

Meanwhile, as the O-ring 130 is disposed outside the window 120, it is possible to efficiently secure the fluid penetration length d. Preferably, the fluid penetration length (d) is formed to be about 10 mm. The fluid penetration length d may be shorter or longer depending on the material through which the light passes. Since 10 mm is a relatively short length, if the O-ring is on the fluid side, which is the inside of the window, it is difficult to adjust the fluid penetration length (d) to 10 mm, it is not effective to secure the fluid penetration length (d), and the O-ring occupies a wide space, and the internal structure of the flow cell 1 becomes complicated. As a result, when the O-ring 130 is disposed between the window 120 and the connector 140, the coupling structure can be simplified, the lens can be easily fixed, and the fluid sealing structure can be improved.

The cable coupler 165 is formed at the end of the optical cable 8. The cable coupler 165 is coupled to the ends of the lens bodies 150 and 160. Cover couplers 185 are provided at both ends of the body 110 in the longitudinal direction of the optical hole 117, and an O-ring 181 is installed between the body 110 and the cover coupler 185. The cover coupler 185 has a cylindrical shape of which both sides are open, and has a protruding jaw formed at an end portion facing the body 110. The cover coupler covers the lens bodies 150 and 160.

A cover 180 is coupled at one side of the cover coupler 185. The cover 180 has a knurling formed on the outer circumferential surface thereof, and is coupled to the body 110 to fix the cover coupler 185 to the body 110. A protective pipe coupler 190 is coupled to an end of the cover coupler 185. A flexible protective pipe 195 made of a flexible material for protecting the optical cable 8 is coupled to an end of the protective pipe coupler 190. That is, one end of the protective pipe coupler 190 is fastened to the cover coupler 185 and the flexible protective pipe 195 is coupled to the other end.

The fluid tubes 35 are detachably connected to both sides of the fluid passage of the body 110. In addition, the fluid pipe 35 is connected to the main pipe through the pitot pipe inlet 33 and the pitot pipe outlet 34. A sealing coupler 170 is provided at a portion where the body 110 and the fluid pipe 35 are connected to each other. The sealing coupler 170 includes a ferrule 171 that presses the outer circumferential surface of the fluid pipe 35 and a nut 172 that is fastened to the body 110 to bind the ferrule 171. When the nut 172 is fastened to the body 110, the nut 172 moves the ferrule 171 in the longitudinal direction of the pipe so that the ferrule 171 presses and fixes the outer circumferential surface of the fluid pipe 35 by the inclined surface of the ferrule 171.

Referring to FIGS. 13 to 21, the concentration measuring device according to the second embodiment of the present invention includes a main tube, a flow cell 2, a spectrometer 9, an optical cable 8, and a control and computing device. Since the concentration measuring device according to the second embodiment differs from that of the first embodiment only in the detail configuration of the flow cell 2, detailed descriptions of repeated structures will be omitted.

The main pipe includes an insert block 3, a pipe part 4 and a fastening part. The insert block 3 has a fluid passage 32 and a plurality of fastening holes 31. The fluid passage 32 has a pitot pipe inlet 33 and a pitot pipe outlet 34 which are formed on the inner circumferential surface thereof. The pipe part 4 is coupled to both sides of the insert block 3 in the longitudinal direction of the pipe. A flange part 45 is formed on the outer circumferential surface of the pipe part 4, and has a hole corresponding to the fastening hole 31 of the insert block 3. The fastening part may include a bolt 46 and a nut 47 fastened through the hole of the pipe part 4 and the fastening hole 31 of the insert block 3.

Figure 22:
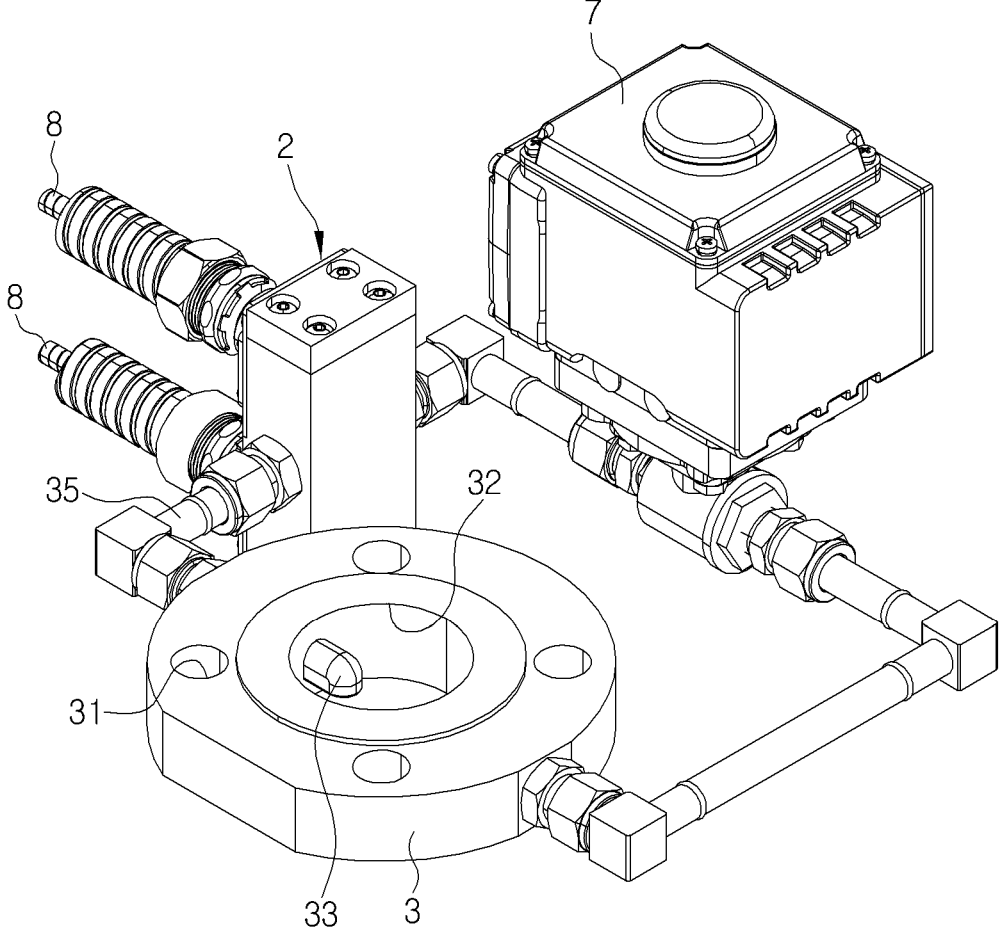
FIG. 22 shows that a valve unit is added to the concentration measuring device according to the embodiment of the present invention.
Figure 23:
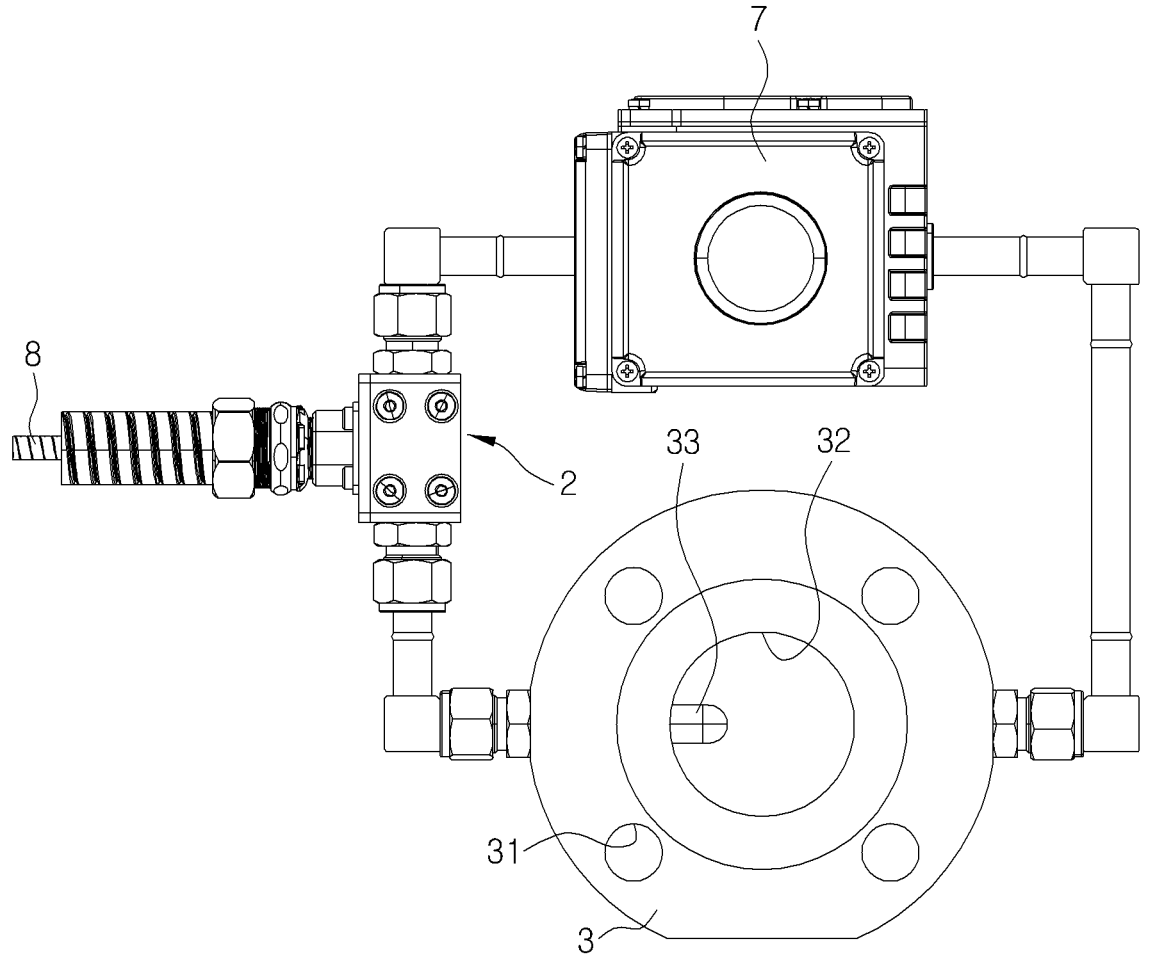
FIG. 23 is a plan view of FIG. 22.

The spectrometer 9 measures the wavelengths of the source light transmitted to the flow cell 2 and the received light received from the flow cell 2 and analyzes the spectrum. An optical cable 8 connects the flow cell 2 and the spectrometer 9 with each other. The control and computing device measures a difference between the source light and the received light, which have a specific wavelength changed while passing through the fluid in the flow cell 2, in the spectrometer 9, and then, absorption data is compared with standard data to analyze them, so all components of chemicals mixed in the fluid can be identified. Meanwhile, further referring to FIGS. 22 and 23, the concentration measuring device may further include a valve unit 7.

The flow cell 2 according to the second embodiment includes a body, a mirror lens body 240, a window 220, a lens bushing 214, and an O-ring 230. An optical cable 8 is connected to the body, and transmits source light from the spectrometer 9 to the body and receives light from the body to the spectrometer 9. That is, a source light cable is connected to one side of the body and a light receiving cable is connected to the other side. In this case, the source light cable and the light receiving cable are connected in the same direction with respect to the body and are configured in a mirror type in which they are arranged side by side.

A fluid passage is formed inside the body and a light passage is formed to pass through the fluid passage. The body includes a main body 210, a lower body 241, an upper body 242, and a front cover 280. The main body 210 has a fluid hole 216 and an optical hole 217. The fluid hole 216 is formed to pass through the main body 210 as a passage of fluid. The optical hole 217 is a passage of light and is formed through in an orthogonal direction to the fluid hole 216. The fluid hole 216 and the optical hole 217 are in direct communication while crossing each other inside the main body 210. That is, the fluid hole 216 and the optical hole 217 in the main body 210 communicate with each other, and when fluid is injected through the fluid hole 216, the optical hole 217 is also filled with the fluid.

The mirror lens body 240 is provided on both sides with respect to the fluid passage of the body to diffuse and condense light. That is, the mirror lens body 240 includes a source light lens body for diffusing light and a light receiving lens body for concentrating light. The source light lens body is coupled to one side based on the fluid hole 216 of the main body 210, and the light receiving lens body is coupled to the other side based on the fluid hole 216 of the main body 210.

The mirror lens body 240 reflects light at 90° to change a route. That is, the light irradiated horizontally through the optical cable 8 is reflected upward by the source light lens body coupled to the lower portion of the main body 210, and passes through the fluid of the fluid hole 216 of the main body 210. Then, the light is reflected horizontally by the light receiving lens body coupled to the upper portion of the main body 210, and moves to the spectrometer 9 through the optical cable 8.

The window 220 is provided on both sides of the fluid passage of the body and is inserted into the light passage to allow light to pass therethrough. The window 220 has a circular plate shape which is relatively thin, and includes a transparent transmission plate made of sapphire or fluorinated ethylene propylene (FEP), and allows light to pass through while preventing fluid from passing therethrough. A stepped portion 218 is formed on the inner circumferential surface of the optical hole 217 of the main body 210. The window 220 is inserted into the optical hole 217 of the main body 210, and supported by the stepped portion 218 of the main body 210. A lens bushing 214 is located at an end of the window 220 opposite to the stepped portion 218. A pair of windows 220 directly face the fluid hole 216 while facing each other.

The lens bushing 214 fixes the window 220 to the body, and is combined with the mirror lens body 240. A pair of lens bushings 214 are fastened to both sides of the main body 210 in the penetration direction of the optical hole 217. That is, one lens bushing 214 is provided on the upper side of the main body 210, and the other lens bushing 214 is provided on the lower side of the main body 210. The lens bushing 214 is fastened to an opening 213 communicating with the optical hole 217 of the main body 210 to fix the window 220 in close contact with the stepped portion 218. A screw thread is formed on the outer circumferential surface of the lens bushing 214, and is screw-coupled with the opening 213 of the main body 210. Two or more tool holes 219 are formed in one surface of the lens bushing 214 to be coupled to working tools when fastened with the main body 210. An accommodation groove is formed in the lens bushing 214 to be coupled to the mirror lens body 240.

The lower body 241 is fastened to a lower portion of a lower accommodation groove of the main body 210. In addition, the upper body 242 is fastened to an upper portion of an upper accommodation groove of the main body 210. The front cover 280 is fastened to the front of the lower body 241, the main body 210, and the upper body 242. The lower body 241 and the upper body 242 are fastened to the main body 210 through screws 215. TH lower body 241 and the upper body 242 respectively have inclined portions formed to support a 45° inclined surface of the mirror lens body 240, and the inclined portions are respectively inserted into the accommodation grooves of the main body 210.

The mirror lens body 240 includes a cable coupling portion 249 protruding toward the optical cable 8 and a vertical protrusion portion 248 protruding toward the optical hole 217 of the main body 210. The mirror lens body 240 is inserted into the accommodation groove of the main body 210, and the front cover 280 is fastened to the front of the lower body 241, the main body 210, and the upper body 242, so that the mirror lens body 240 is fixed without being separated from the main body 210. A fixed cover 286 is further included between the front cover 280 and the main body 210 to fix the mirror lens body 240.

The O-ring 230 seals between the fluid passage and the light passage of the body. The O-ring 230 is disposed outside the window 220 based on the fluid passage of the body. That is, the O-ring 230 is formed between the window 220 and the lens bushing 214. An inclined taper 245 is formed at an end of the lens bushing 214 facing the window 220. When the lens bushing 214 is fastened to the main body 210 and the window 220 is fixed to the main body 210, the taper 245 makes the O-ring 230 come into contact with the stepped portion 218 of the body 210.

Figure 18:
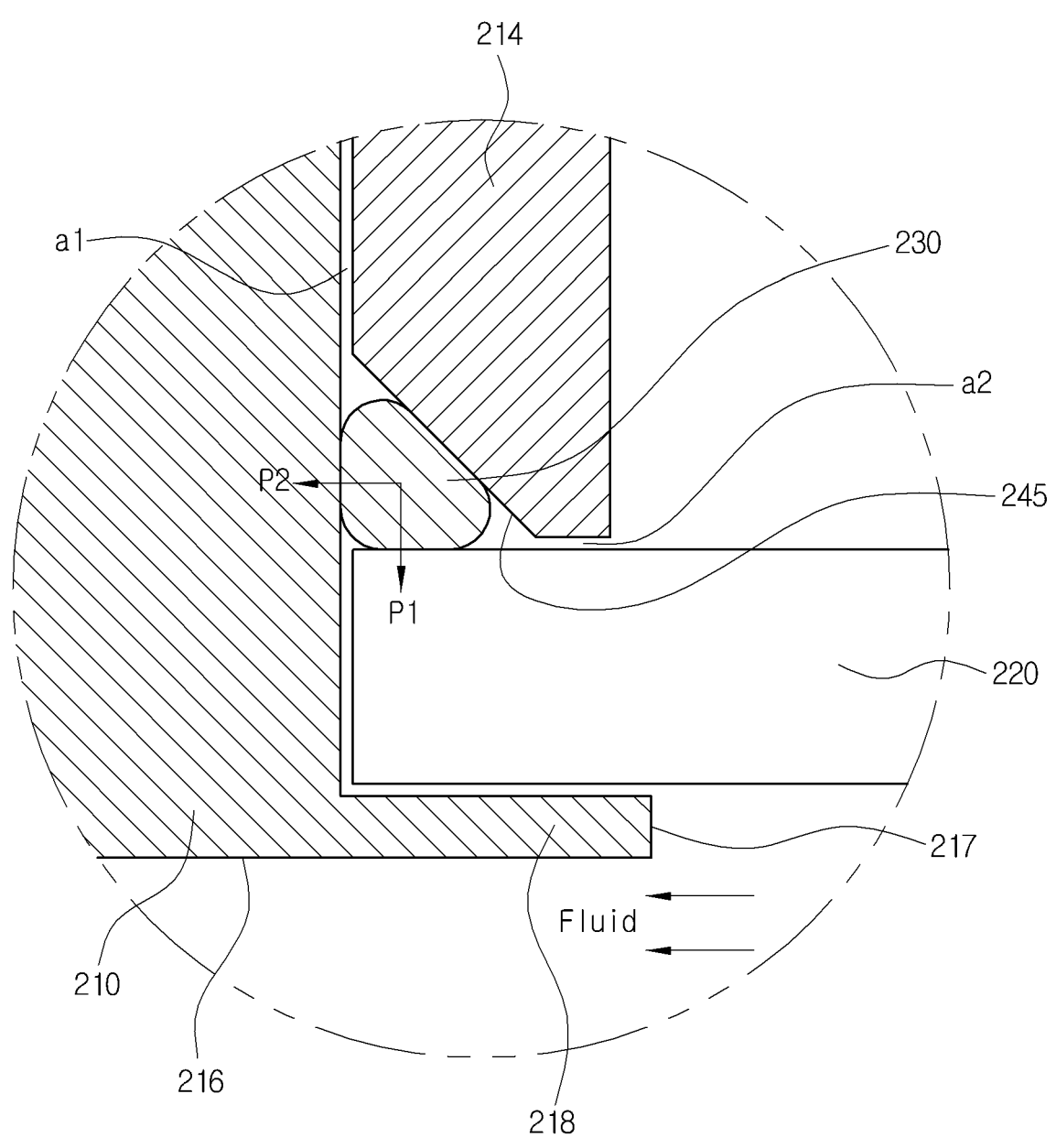
FIG. 18 is an enlarged cross-sectional view of "B" in FIG. 16.
Figure 19:
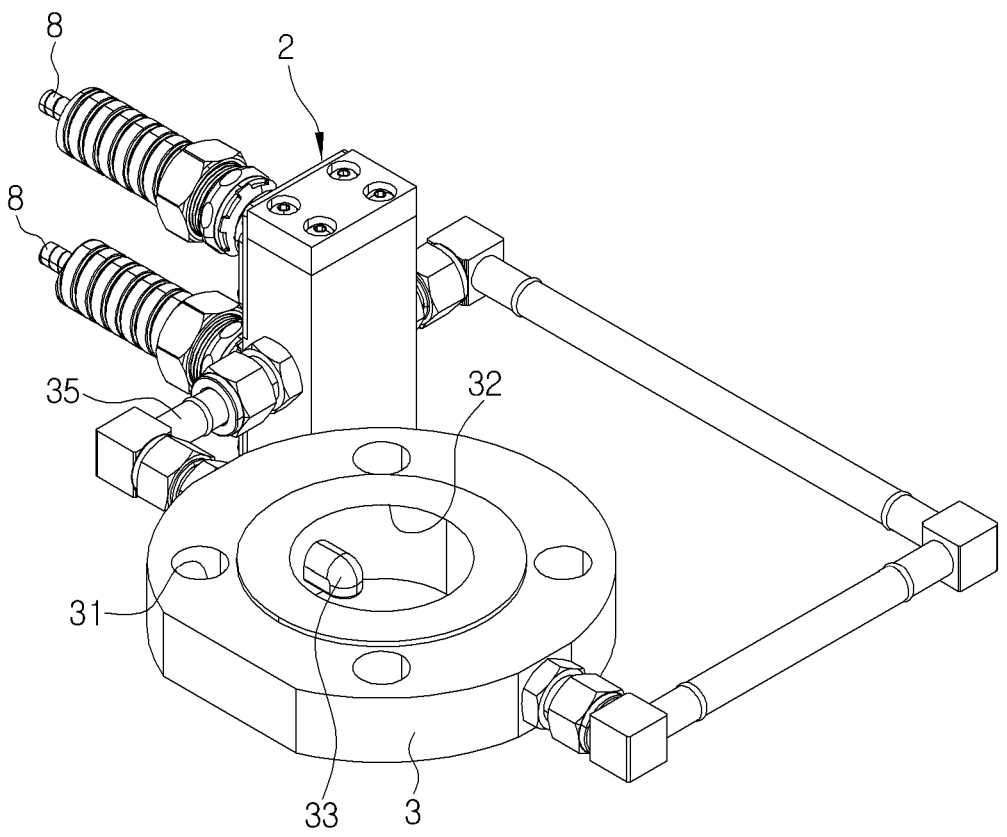
FIG. 19 is a perspective view illustrating the concentration measuring device according to the second embodiment of the present invention.
Figure 20:
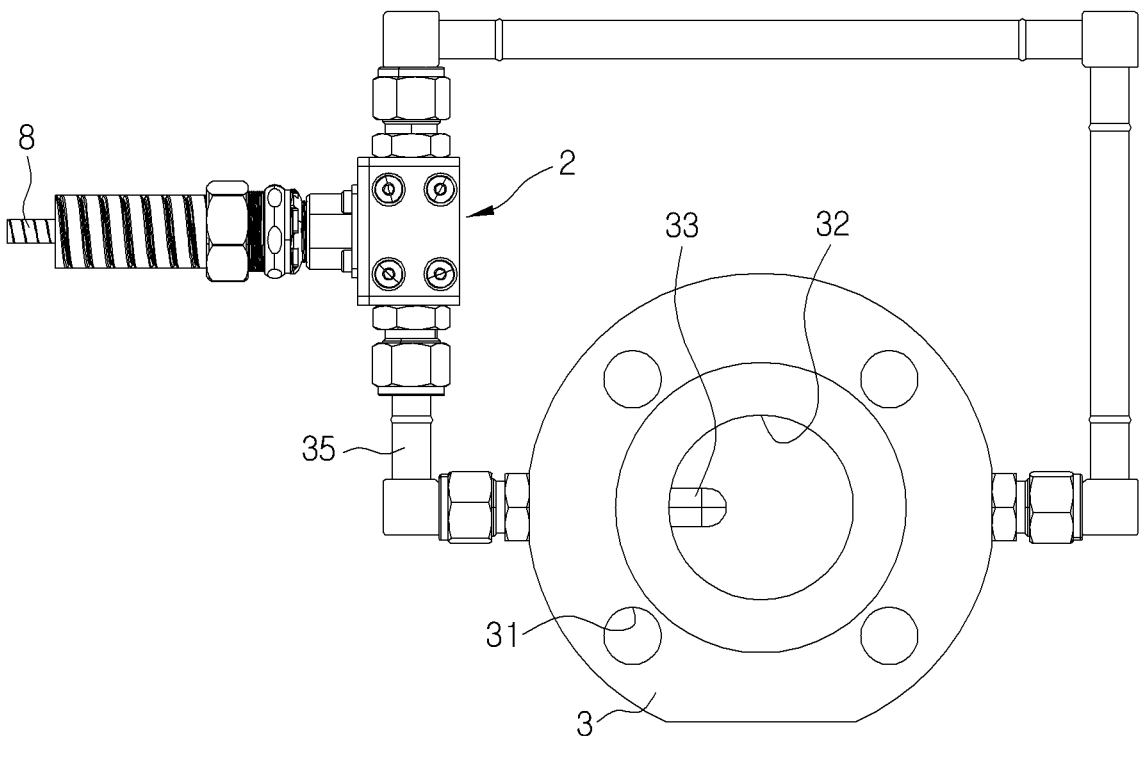
FIG. 20 is a front view illustrating the concentration measuring device according to the second embodiment of the present invention.
Figure 21:
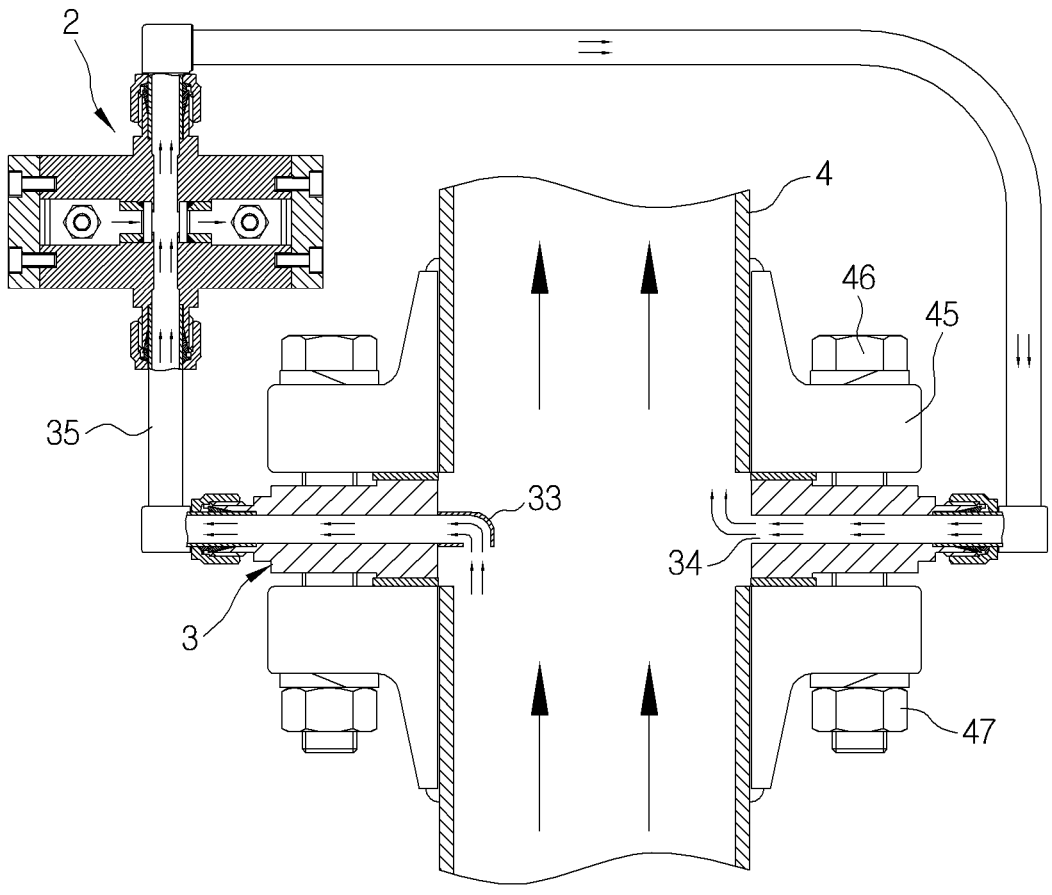
FIG. 21 is a cross-sectional view illustrating the inside of the concentration measuring device according to the second embodiment of the present invention.

As illustrated in FIG. 18, when the lens bushing 214 is fastened to the main body 210, the window 220 is fixed between the stepped portion 218 of the body 110 and the lens bushing 214. In this case, a fine gap is formed between the end of the window 220 and the stepped portion 218 in the longitudinal direction of the optical hole 217, and another fine gap is formed between the end of the window 220 and the inner circumferential surface of the optical hole 217 in a radial direction. The fluid flowing through the fluid hole 216 passes through a stepped hole 217 formed by the stepped portion 218. In this case, the taper 145 formed on the inclined surface of the lens bushing 214 presses the O-ring 230 in a direction P1 and a direction P2. Accordingly, it is possible to prevent fluid from leaking through a gap a2 between the lens bushing 214 and the window 220 and a gap a1 between the lens bushing 214 and the optical hole 217.

Meanwhile, as the O-ring 230 is disposed outside the window 220, it is possible to efficiently secure the fluid penetration length d. Preferably, the fluid penetration length (d) is formed to be about 10 mm. The fluid penetration length d may be shorter or longer depending on the material through which the light passes. Since 10 mm is a relatively short length, if the O-ring is on the fluid side, which is the inside of the window, it is difficult to adjust the fluid penetration length (d) to 10 mm, it is not effective to secure the fluid penetration length (d), and the O-ring occupies a wide space, and the internal structure of the flow cell 2 becomes complicated. As a result, when the O-ring 130 is disposed between the window 220 and the lens bushing 214, the coupling structure can be simplified, the lens can be easily fixed, and the fluid sealing structure can be improved.

A cable coupler 265 is formed at the end of the optical cable 8, and the cable coupler 265 is coupled to the cable coupling portion 249 of the mirror lens body 240. A connector coupler 285 is fastened to the front of the front cover 280. A protective pipe coupler 290 is fastened to the connector coupler 285. A flexible protection pipe 295 made of a flexible material for protecting the optical cable 8 is coupled to an end of the protective pipe coupler 290. That is, one end of the protective pipe coupler 290 is fastened to the connector coupler 285 and the flexible protective pipe 295 is coupled to the other end.

The fluid tubes 35 are detachably connected to both sides of the fluid passage of the body. In addition, the fluid pipe 35 is connected to the main pipe through the pitot pipe inlet 33 and the pitot pipe outlet 34. A sealing coupler 270 is provided at a portion where the main body 210 and the fluid pipe 35 are connected to each other. The sealing coupler 270 includes a ferrule 271 that presses the outer circumferential surface of the fluid pipe 35 and a nut 272 that is fastened to the main body 210 to bind the ferrule 271. When the nut 272 is fastened to the main body 210, the nut 272 moves the ferrule 271 in the longitudinal direction of the pipe so that the ferrule 271 presses and fixes the outer circumferential surface of the fluid pipe 35 by the inclined surface of the ferrule 271.

The optical cable 8 cannot be sharply bent when connecting the flow cell 2 and the spectrometer 9, and must have a radius of curvature greater than or equal to a certain level. Considering these characteristics, it is preferable that the optical cable 8 has a mirror type rather than a straight type in terms of arrangement of the optical cable 8. As an embodiment of the mirror type, there is a right angle type in which the optical cable 8 is disposed in an orthogonal direction to the longitudinal direction of the fluid pipe 35.

Figure 24:
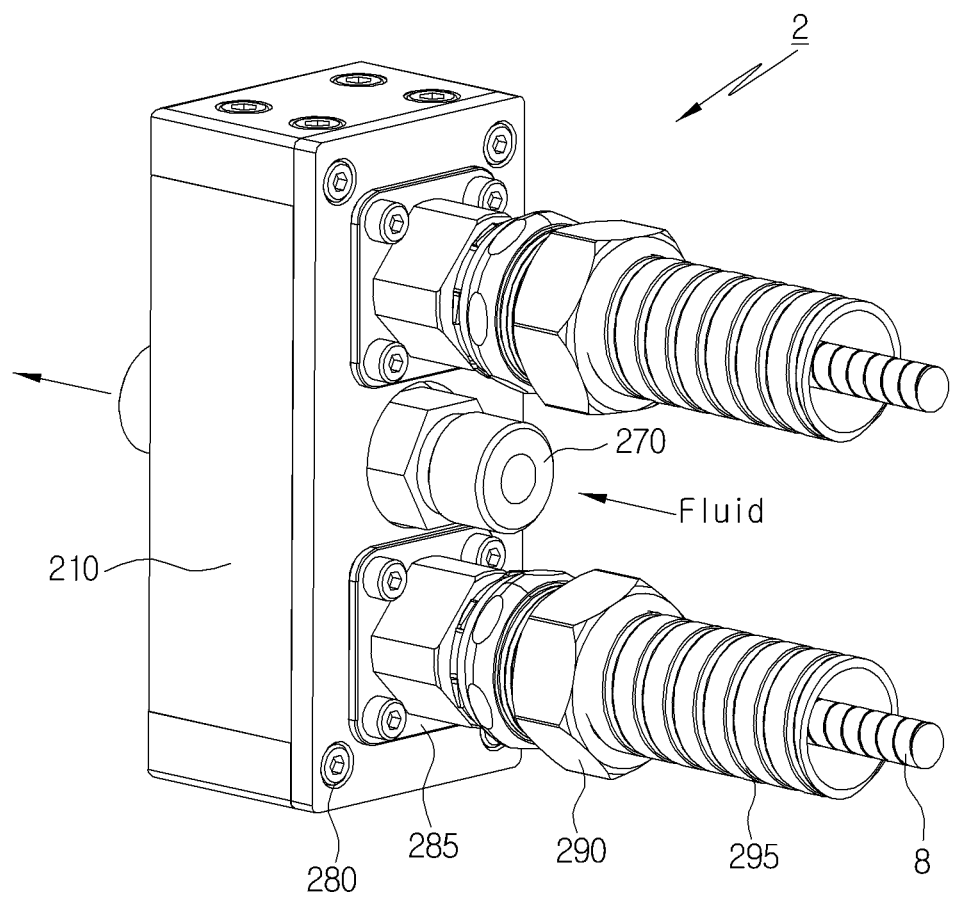
FIG. 24 is a perspective view illustrating a flow cell according to a modification of FIG. 14.
Figure 25:
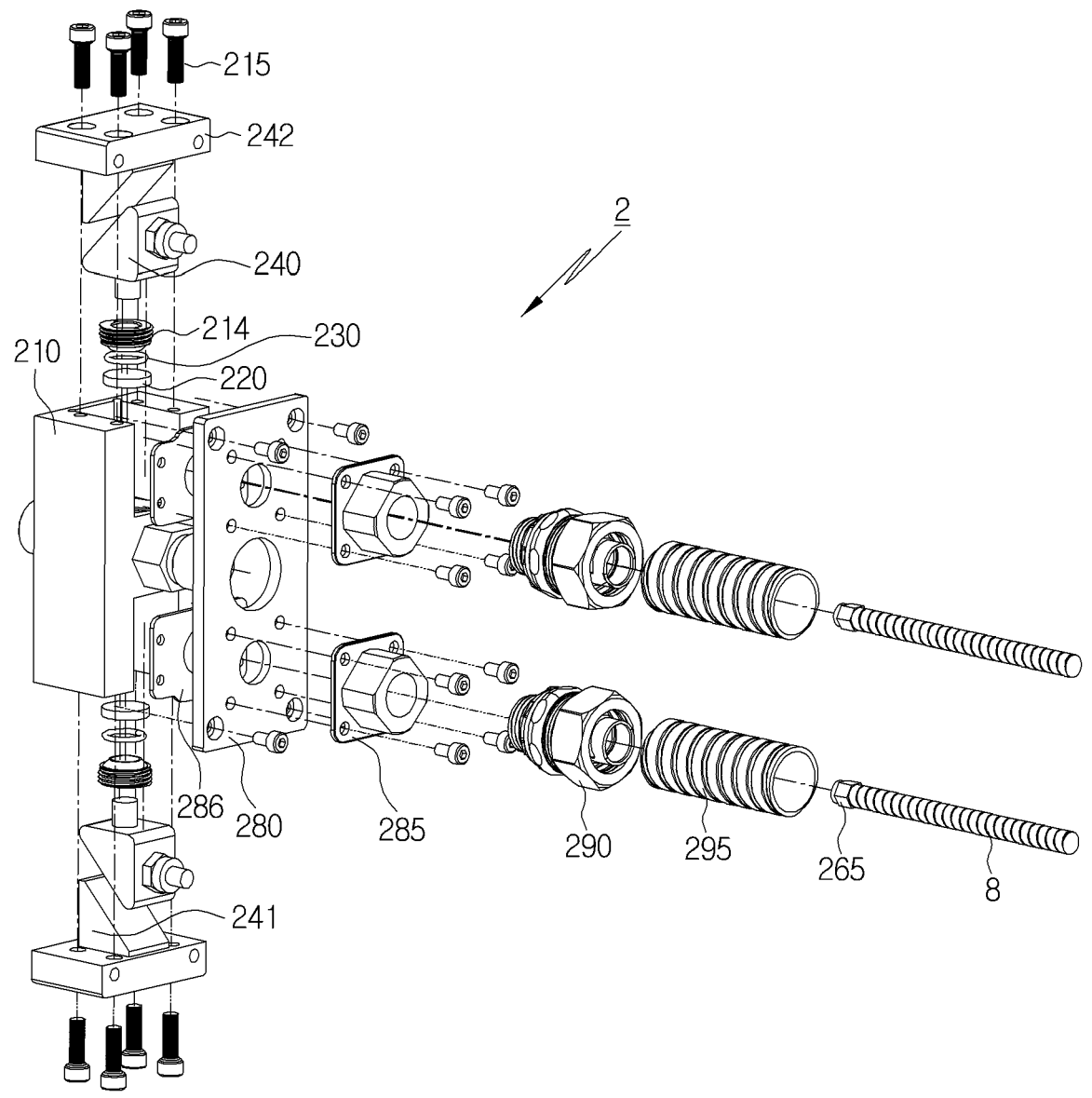
FIG. 25 is an exploded perspective view of FIG. 24.
Figure 26A:
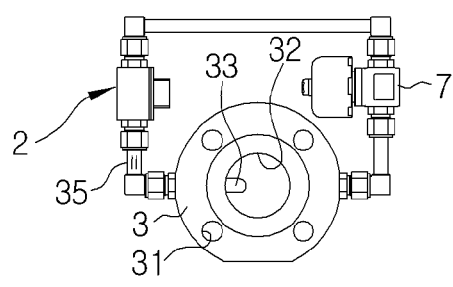
FIGS. 26A-26C illustrate examples with respect to the arrangement of main tubes, flow cells, and valve units with various sizes.
Figure 26B:
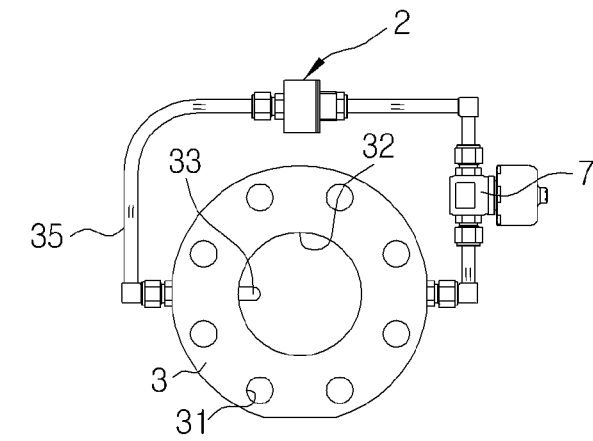
Figure 26C:
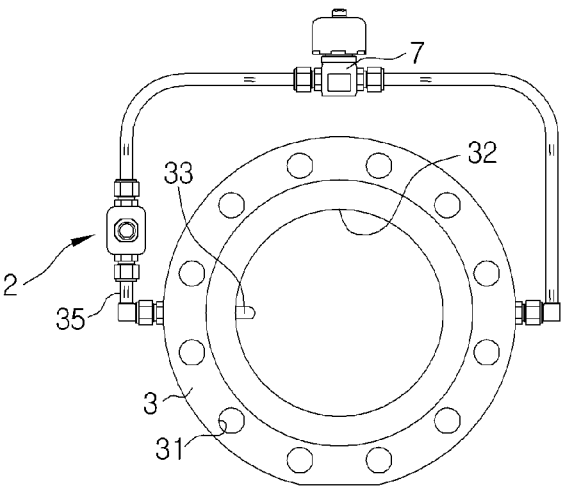

On the other hand, further referring to FIGS. 24 and 25, it is also possible to arrange the optical cable 8 parallel to the longitudinal direction of the fluid pipe 35. In this case, the sealing coupler 270, which is a connection part of the fluid pipe 35, is formed on the front and rear sides of the main body 210 to be in the same direction as the connection part of the optical cable 8. In addition, as illustrated in FIGS. 26A-26C, the concentration measuring device can be applied to main tubes of various sizes, such as 40A, 80A, and 200A, and the arrangement of the flow cell 2 and the valve unit 7 may be appropriately changed.

Although the flow cell and the concentration measuring device according to the present invention have been described with reference to the embodiments illustrated in the drawings, it will be understood by those of ordinary skill in the art that various changes and modifications may be made therein without departing from the technical idea and scope of the present invention. Therefore, the true scope of technical protection should be determined by the technical spirit of the appended claims.

What is claimed is:

1. A flow cell comprising:
a body having a fluid passage and a light passage formed to pass through the fluid passage;
an optical cable connected to the body to transmit source light from a spectrometer to the body and to transmit receiving light from the body to the spectrometer;

a mirror lens body provided on both sides of the fluid passage to diffuse and condense light;
a window provided on both sides of the fluid passage and inserted into the light passage to transmit light; and
a lens bushing fixing each window to the body and connected to each mirror lens body,
wherein a source light cable and a light receiving cable are arranged to be side by side with each other by being connected in a same direction with respect to the body, and
wherein O-rings are provided to seal between the fluid passage and the light passage.

2. The flow cell according to claim 1, wherein the window provided on both sides of the fluid passage comprises a first window and a second window, the O-rings comprise a first O-ring and a second O-ring, the first O-ring is disposed outside the first window based on the fluid passage, and the second O-ring is disposed outside the second window based on the fluid passage.

3. The flow cell according to claim 2, wherein the body includes a main body, and
wherein a fluid hole, which is the fluid passage, is formed to pass through the main body, and an optical hole, which is the light passage, is formed to pass through the body in an orthogonal direction to the fluid hole.

4. The flow cell according to claim 3, wherein
the lens bushing includes a first lens bushing fixing the first window to the body and a second lens bushing fixing the second window to the body, and
wherein a first inclined taper is formed at an end of the first lens bushing facing the first window to press the first O-ring, and a second inclined taper is formed at an end of the second lens bushing facing the second window to press the second O-ring.

5. The flow cell according to claim 3, wherein a stepped portion supporting the first window protrudes from an inner circumferential surface of the optical hole.

6. The flow cell according to claim 3, wherein the fluid hole and the optical hole are in direct communication with each other while crossing each other.

7. The flow cell according to claim 6, wherein the first window faces the second window, the first window directly faces the fluid hole, and the second window directly faces the fluid hole.

8. The flow cell according to claim 3, wherein the mirror lens body is provided on both sides of the main body in a penetration direction of the optical hole, and
wherein an accommodation groove for accommodating each mirror lens body is formed in the main body.

9. The flow cell according to claim 8, wherein the body comprises:
a lower body fastened to a lower portion of a lower accommodation groove of the main body;
an upper body fastened to an upper portion of an upper accommodation groove of the main body; and
a front cover fastened to a front of the lower body, the main body, and the upper body.

* * * * *